(12) United States Patent
Taguchi et al.

(10) Patent No.: US 10,974,143 B2
(45) Date of Patent: Apr. 13, 2021

(54) TERMINAL DEVICE, INFORMATION PROCESSING SYSTEM PERFORMING GAME PROCESSING, AND INFORMATION PROCESSING DEVICE

(71) Applicant: SEGA CORPORATION, Tokyo (JP)

(72) Inventors: Kenji Taguchi, Tokyo (JP); Akihiro Nakamura, Tokyo (JP); Motonobu Shinotsuka, Tokyo (JP); Toshifumi Imai, Tokyo (JP); Yusuke Takiguchi, Tokyo (JP); Naoko Maekawa, Tokyo (JP); Seiki Saito, Tokyo (JP); Makoto Niina, Tokyo (JP); Toshiyuki Mukaiyama, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 71 days.

(21) Appl. No.: 15/680,792

(22) Filed: Aug. 18, 2017

(65) Prior Publication Data

US 2017/0340967 A1  Nov. 30, 2017

Related U.S. Application Data

(63) Continuation of application No. PCT/JP2016/052634, filed on Jan. 29, 2016.

(30) Foreign Application Priority Data

Feb. 18, 2015  (JP) .................................. 2015-030078

(51) Int. Cl.
*A63F 13/40* (2014.01)
*A63F 13/25* (2014.01)
(Continued)

(52) U.S. Cl.
CPC .............. *A63F 13/40* (2014.09); *A63F 13/25* (2014.09); *A63F 13/35* (2014.09); *A63F 13/822* (2014.09); *A63F 2300/5533* (2013.01)

(58) Field of Classification Search
CPC .......... A63F 13/40; A63F 13/25; A63F 13/35; A63F 13/822; A63F 13/00
See application file for complete search history.

(56) References Cited

U.S. PATENT DOCUMENTS

2007/0060226 A1* 3/2007 Sakaguchi .............. A63F 13/10
463/1

FOREIGN PATENT DOCUMENTS

| JP | 2794230 B2 | 9/1998 |
|---|---|---|
| JP | 2013-230236 A | 11/2013 |
| JP | 5485330 B2 | 5/2014 |

OTHER PUBLICATIONS

Endless_Legend_Manual.pdf, http://cdn1.macgamestore.com/macgamesarcade/manuals/Endless_Legend_Manual.pdf, published on May 6, 2014, last accessed on Mar. 8, 2019 (Year: 2014).*

(Continued)

*Primary Examiner* — Yingchuan Zhang
(74) *Attorney, Agent, or Firm* — Osha Bergman Watanabe & Burton LLP

(57) ABSTRACT

A terminal device includes a memory that stores, characters in a game, a plurality of slots into which action reservations for the characters are to be registered, an action sequence for each of the slots, and effects, a display, a receiver that receives a request of an action reservation for a first character, and a processor that outputs, to the memory, the request when the processor determines the first character is in an active state in which the character is allowed to register the action reservation. The memory registers the first character in an earliest slot in the action sequence among the slots in which no other characters have been registered. The processor causes the first character to execute an action associated with the slot according to the action sequence. The effect associated with the first character is applied to the executed action.

13 Claims, 24 Drawing Sheets

(51) Int. Cl.
     *A63F 13/35*          (2014.01)
     *A63F 13/822*        (2014.01)

(56) References Cited

OTHER PUBLICATIONS

Endless_Legend—All News-09252014.pdf, https://store.steampowered.com/news/?appids=289130&enddate=1412146800&appgroupname=Endless+Legend, published on Sep. 25, 2014, last accessed on Mar. 11, 2019 (Year: 2014).*
International Search Report issued in corresponding International Application No. PCT/JP2016/052634 dated Apr. 19, 2016 (3 pages).
Written Opinion issued in corresponding International Application No. PCT/JP2016/052634 dated Apr. 19, 2016 (9 pages).
Orutanshia Saga Ao no Kishidan Hortensia SAGA, Fami-tsu App iPhone No. 024, p. 48-53, dated Jul. 9, 2015 (8 pages(.

* cited by examiner

Lane information

| Lane information ID | Effect | Execution sequence | Registered character ID |
|---|---|---|---|
| 1 | Attack x 1.5 | 1 | P01 |
| 2 | Recovery | 2 | P02 |
| 3 |  | 3 | E01 |
| 4 | Max skill | 4 |  |
| 5 |  | 5 |  |

FIG. 10

Display information

| Character ID | Image ID | Mini character image ID | Character panel position | Grid position | Active state start time | Skill count |
|---|---|---|---|---|---|---|
| P01 | P_G01 | Chibi_P_G01 | 1 | U_01 | 18:00:05 | MAX |
| ... | ... | ... | ... | ... | ... | ... |
| E01 | E_G01 | Chibi_E_G01 | | E_01 | 18:00:10 | |
| ... | ... | ... | ... | ... | ... | ... |

FIG. 11

Character information

| Character information ID | Attack characteristic | Physical strength | Attack strength | Defense strength | Quickness |
|---|---|---|---|---|---|
| P01 | Cutting | 1000 | 100 | 100 | 50 |
| P02 | Thrusting | 2000 | 200 | 200 | 80 |
| ⋮ | ⋮ | ⋮ | ⋮ | ⋮ | ⋮ |
| E01 | Cutting | 500 | 80 | 80 | 30 |
| ⋮ | ⋮ | ⋮ | ⋮ | ⋮ | ⋮ |

FIG. 12

TERMINAL DEVICE, INFORMATION PROCESSING SYSTEM PERFORMING GAME PROCESSING, AND INFORMATION PROCESSING DEVICE

BACKGROUND

Technical Field

The present invention generally relates to a terminal device, an information processing system, and an information processing device.

Related Art

In role-playing games (RPG), battle games, and other such games, real-time battle systems (called active-time battles) and by-turn battle systems have been known in the past (see Patent Literature 1, for example).

Patent Literature 1: Japanese Patent No. 2,794,230

A by-turn battle system is static, with a battle beginning upon completion of a command input from a player. On the other hand, a real-time battle system keeps track of time corresponding to a character for every character, and is able to accept command inputs from a player for a character whose timing is complete, and battles are repeated in a state in which time is flowing. Thus, with a real-time battle system, even though a player does not input a command for a character whose timing is complete, an enemy character will start performing an action such as an attack, so this style is more dynamic than a by-turn battle system.

However, in conventional real-time battle systems, since it is advantageous to have a player's character perform an action before an enemy character does, a player tends to only input commands in sequence to characters whose timing is complete. Therefore, these conventional real-time battle systems may cause the game to feel monotonous, requiring minimal strategic decisions from a player.

SUMMARY

One or more embodiments of the present invention allow a game to accept highly strategic action reservations from a player.

One or more embodiments of the present invention provide a terminal device that accepts an action reservation for one or more first characters from a player in a game, the terminal device comprising a control means for managing a plurality of reservation slots into which action reservations for the first character appearing in the game or for second characters for which someone other than the player will reserve actions can be registered, an action sequence for each of the reservation slots, effects that are set in the reservation slots, and the first or second characters registered in the reservation slots, in association with each other, and displaying the reservation slots in association with the effects set in the reservation slots and the first or second characters registered in the reservation slots, according to the action sequence; an action reservation accepting means which, upon accepting an action reservation for the first or second character in a state in which actions can be reserved, registers the first or second character for which the action reservation has been accepted, in the earliest reservation slot in the action sequence among reservation slots in which no other characters have been registered; and an action executing means which, when an action for a first or second character associated with a reservation slot is executed in accordance with the action sequence and an effect has been set in that reservation slot, executes the action of the first or second character while reflecting the effect that was set in the reservation slot.

According to one or more embodiments of the present invention, a game can accept highly strategic action reservations from a player.

BRIEF DESCRIPTION OF DRAWINGS

FIG. 10 is a configuration diagram of an example of lane information according to one or more embodiments of the present invention.

FIG. 11 is a configuration diagram of an example of display information according to one or more embodiments of the present invention.

FIG. 12 is a configuration diagram of an example of character information according to one or more embodiments of the present invention.

DETAILED DESCRIPTION

Embodiments of the present invention will be described below in detail with reference to the drawings. However, embodiments of the present invention described below are nothing but an example, and are not intended to exclude the application of various modifications or techniques not specifically expressed below. That is, embodiments of the present invention can be modified in various ways without departing from the gist thereof. Also, in the discussion of the drawings below, portions that are the same or similar will be assigned the same or similar reference signs. The drawings are simplified, and do not necessarily match the actual dimensions, proportions, and so forth. From one drawing to the next, there may be portions in which the dimensional relations and proportions are not the same.

In one or more embodiments of the present invention, an example of accepting a command input for a character in a battle occurring in a game, such as what is seen in an RPG, will be described, but embodiments of the present invention is not limited to a battle. Embodiments of the present invention can be broadly applied to situations in which command inputs from a player to a character on the screen in a competing game are accepted in real time.
(System Configuration)

Figure 1A:
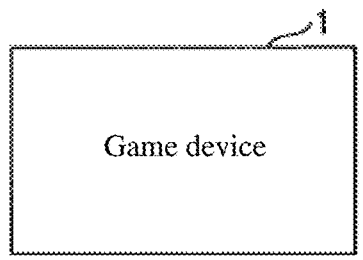
FIGS. 1A and 1B are configuration diagrams of an example of the information processing system according to one or more embodiments of the present invention.
Figure 1B:
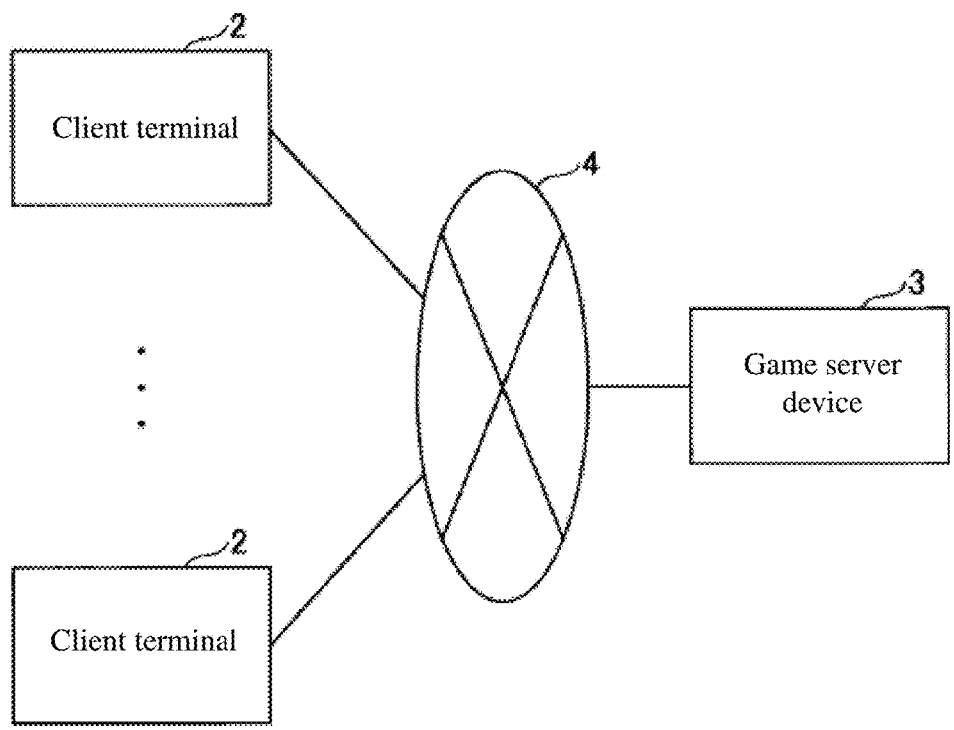

FIGS. 1A and 1B are configuration diagrams of an example of the information processing system according to one or more embodiments of the present invention. The information processing system in FIG. 1A comprises a single game device 1. The game device 1 is a terminal device such as a PC, a smart phone, or a tablet that has an input means such as a mouse or a touch panel operated by a player, or a terminal device such as a dedicated game machine for home or commercial use.

Also, with the information processing system in FIG. 1B, one or more client terminals 2 and a game server 3 are connected via a network 4 such as the Internet. The client terminals 2 are a terminal device such as a PC, a smart phone, or a tablet operated by a player, or a terminal device such as a dedicated game device for home or commercial use. The game server 3 performs management and control of games played by players on the client terminals 2.

Thus, one or more embodiments of the present invention can be applied not only to a client/server type of information processing system as shown in FIG. 1B, but also to the single game device 1 shown in FIG. 1A.

It should go without saying that the information processing system in FIG. 1 is just an example, and that there are various other system configuration examples depending on the application and purpose. For instance, the game server 3 in FIG. 1B may be configured to be distributed among a plurality of computers.
(Hardware Configuration)
(Game Device and Client Terminal)

Figure 2:
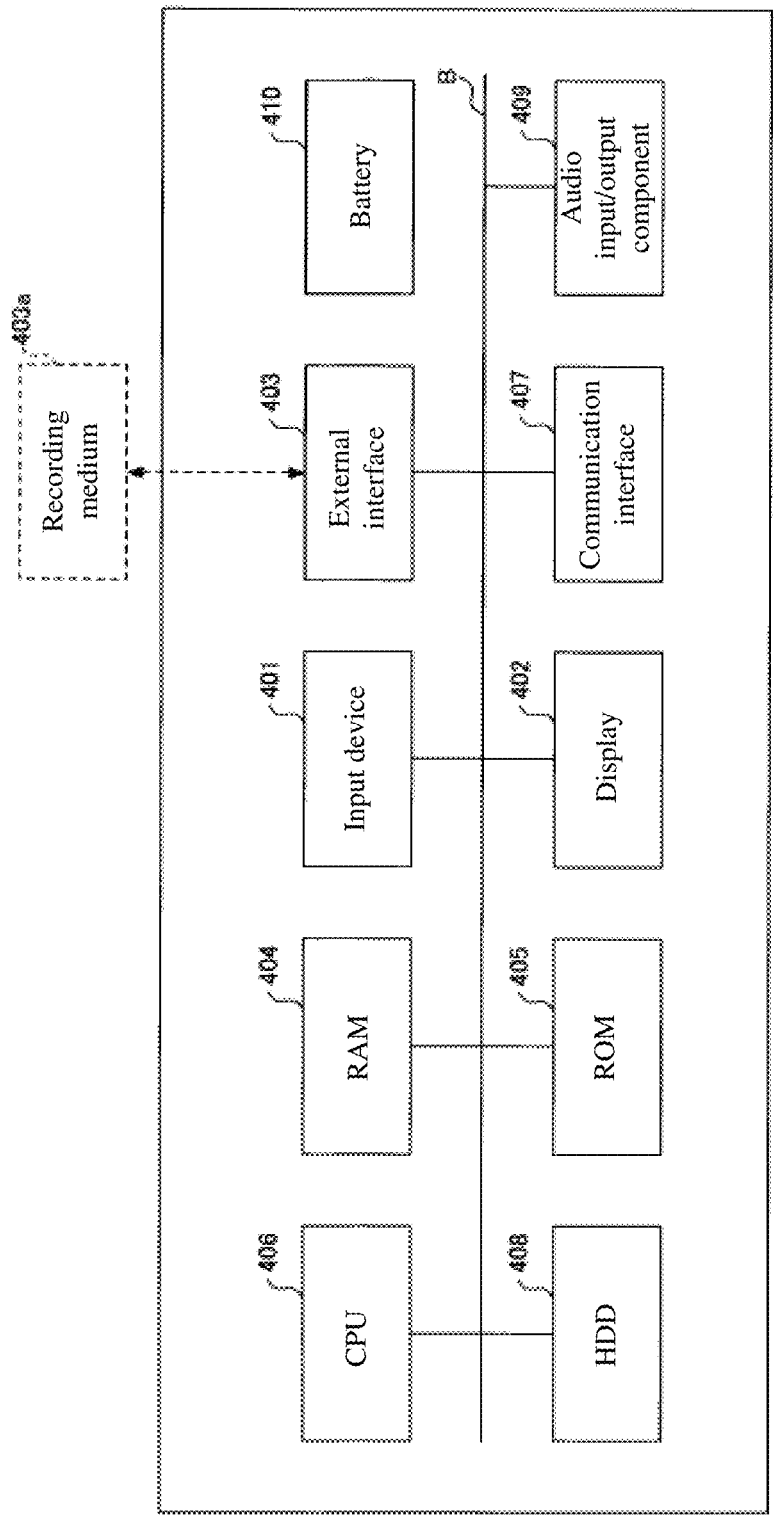
FIG. 2 is a hardware configuration diagram of an example of the terminal device according to one or more embodiments of the present invention.

Terminal devices such as the game device 1 and the client terminals 2 in FIG. 1A are realized by the hardware configuration shown in FIG. 2, for example. FIG. 2 is a hardware configuration diagram of an example of the terminal device according to one or more embodiments of the present invention.

The terminal device in FIG. 2 comprises an input device 401, a display 402, an external interface 403, a RAM 404, a ROM 405, a CPU (or processor) 406, a communication interface 407, an HDD 408, an audio input/output component 409, etc. These components are connected to each other by a bus B.

The input device 401 is a mouse or a touch panel, operation keys or buttons provided to the housing of the terminal device, or the like, and are used by a player to input various signals. The display 402 is a liquid crystal, organic EL, or the like for displaying a screen. A touch panel is made up, for example, of a pressure-sensitive, electrostatic, or other type of panel mounted on the display 402, and detects a touch position by a finger, a stylus, or the like on the display 402.

The communication interface 407 connects the terminal device to the network 4. Consequently, the terminal device performs data communication via the communication interface 407. The HDD 408 is an example of a nonvolatile storage device that stores programs and data. Programs and data that are stored include an OS, which is the basic software that controls the entire terminal device, applications, which provide various functions on the OS, and the like. The terminal device may use a drive device (such as a solid state drive: SSD) that uses a flash memory as a storage medium, instead of the HDD 408.

The external interface 403 interface pictures with an external device. The external device is a recording medium 403a or the like. Consequently, the terminal device can read from and/or write to the recording medium 403a via the external interface 403. The recording medium 403a may be a flexible disk, a CD, a DVD, an SD memory card, a USB memory, or the like.

The ROM 405 is an example of a nonvolatile semiconductor memory (storage device) that can hold programs and data even when the power has been shut off. The ROM 405 stores programs and data such as BIOS, OS settings, and network settings executed at the start-up of the terminal device. The RAM 404 is an example of a volatile semiconductor memory (storage device) that temporarily holds programs and data.

The CPU 406 is an arithmetic unit that realizes control and functions of the entire terminal device by reading programs and data from the storage device such as the ROM 405 and the HDD 408 onto the RAM 404 and executing processing. The terminal device also comprises a dedicated battery 410. The terminal device is driven by the battery 410. The audio input/output component 409 includes a microphone for inputting sound and a speaker for outputting sound.

Thus, the terminal device according to one or more embodiments of the present invention can realize the various processing discussed below by means of this hardware configuration.

Game Server Device

Figure 3:
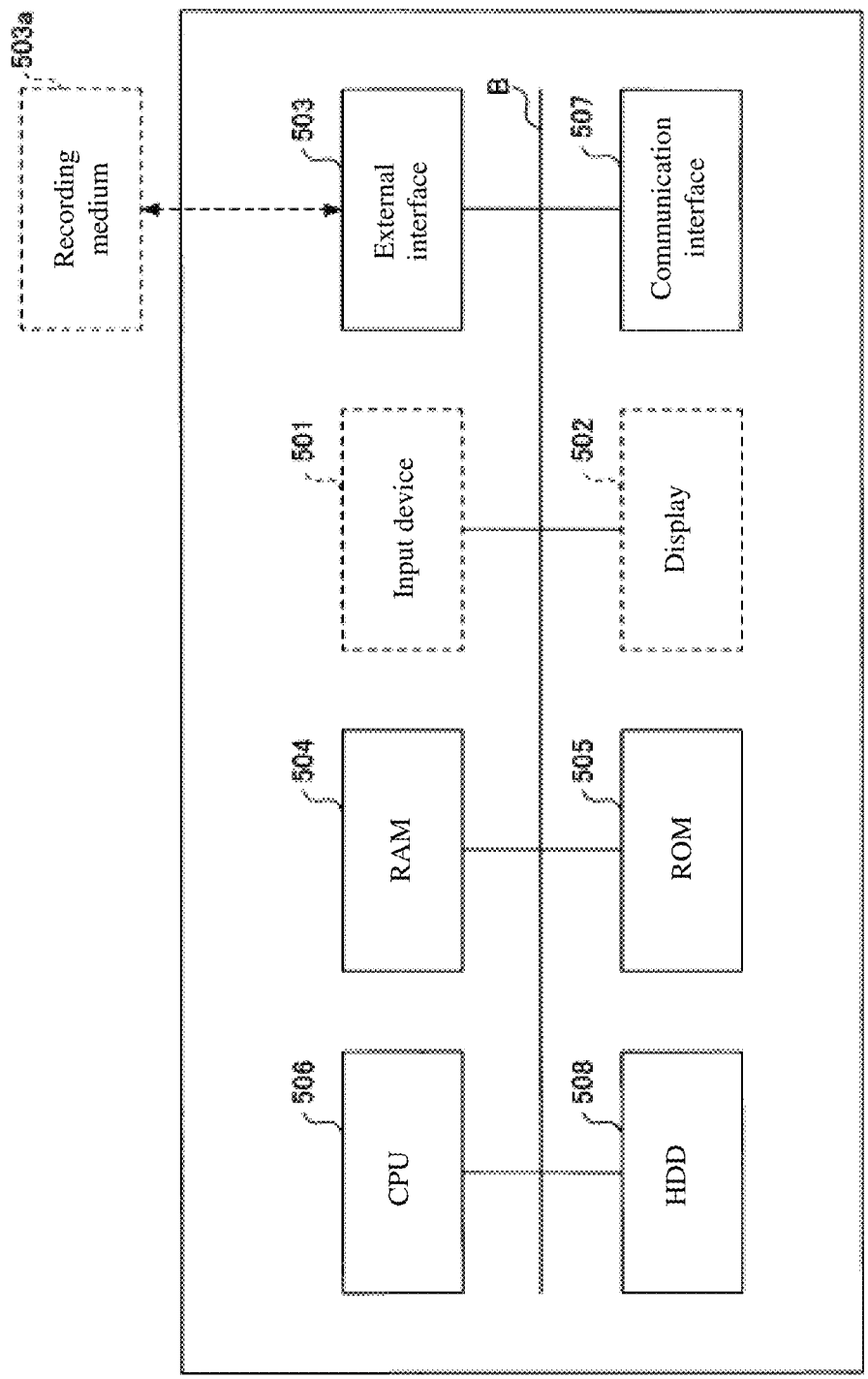
FIG. 3 is a hardware configuration diagram of an example of the game server according to one or more embodiments of the present invention.

The game server 3 in FIG. 1 is realized by a computer having the hardware configuration shown in FIG. 3, for example. FIG. 3 is a hardware configuration diagram of an example of the game server according to one or more embodiments of the present invention. The game server 3 in FIG. 3 comprises an input device 501, a display 502, an external interface 503, a RAM 504, a ROM 505, a CPU 506, a communication interface 507, an HDD 508, and so forth, which are connected to each via a bus B. The input device 501 and the display 502 may be configured so that they are connected for use only when necessary.

The input device 501 includes a keyboard, a mouse, etc., and is used by a player to input operation signals. The display 502 includes a display, etc., and is used for displaying processing results. The communication interface 507 connects the game server 3 to the network 4. Consequently, the game server 3 can perform data communication via the communication interface 507.

The HDD 508 is an example of a nonvolatile storage device that stores programs and data. The programs and data that are stored include an OS, which is the basic software that controls the entire game server 3, and applications, which provide various functions on the OS.

The external interface 503 interface pictures with an external device. This external device may be a recording medium 503a or the like. Consequently, the computer 500 can read from and/or write to the recording medium 503a via the external interface 503. The recording medium 503a may be a flexible disk, a CD, a DVD, an SD memory card, a USB memory, or the like.

The ROM 505 is an example of a nonvolatile semiconductor memory (storage device) that can hold programs and data even when the power has been shut off. The ROM 505 stores programs and data such as BIOS, OS settings, and network settings executed at the start-up of the game server 3. The RAM 504 is an example of a volatile semiconductor memory (storage device) that temporarily holds programs and data.

The CPU 506 is an arithmetic unit that realizes control and functions of the entire game server 3 by reading programs and data from a storage device such as the ROM 505 or the HDD 508 onto the RAM 504 and executing processing.

The game server 3 according to one or more embodiments of the present invention can realize various processing as described below by means of this hardware configuration.

Software Configuration

The software configuration of the information processing system according to one or more embodiments of the present invention will be described separately for the game device 1 in FIG. 1A and the client terminals 2 and the game server 3 in FIG. 1B.

Game Device

Figure 4:
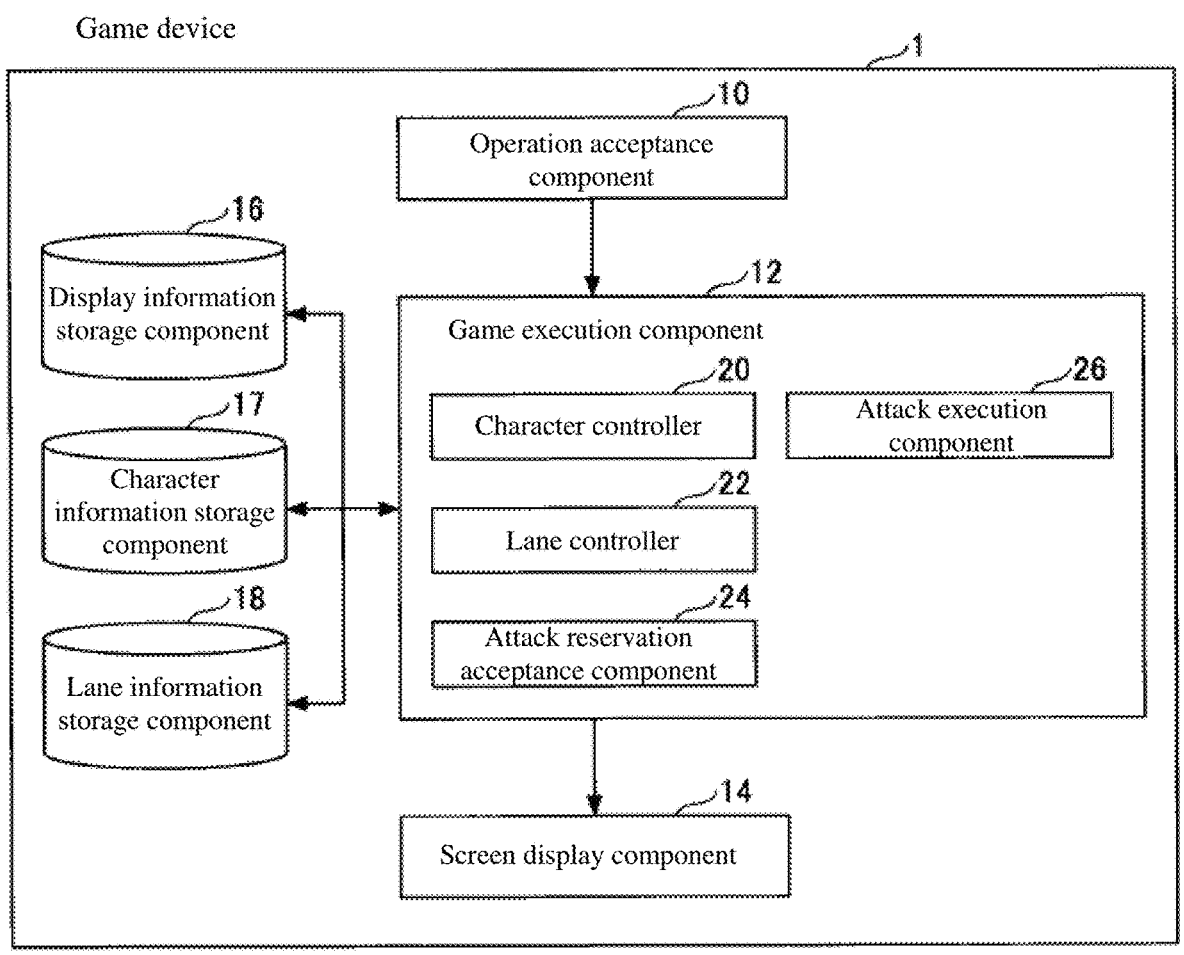
FIG. 4 is a processing block diagram of an example of the game device according to one or more embodiments of the present invention.

The game device 1 in FIG. 1A is realized by the processing blocks shown in FIG. 4, for example. FIG. 4 is a processing block diagram of an example of the game device according to one or more embodiments of the present invention. The game device 1 executes a program to realize the operation acceptance component 10, a game execution component 12, a screen display component 14, a display information storage component 16, a character information storage component 17, and a lane information storage component 18. The game execution component 12 is configured to have a character controller 20, a lane controller 22, an attack reservation acceptance component 24, and an attack execution component 26.

The operation acceptance component 10 accepts an operation from a player operating the game device 1. The game execution component 12 performs processing related to the game according to the operation accepted from the player by the operation acceptance component 10, and causes the game to proceed.

The character controller 20 of the game execution component 12 controls the characters displayed on the screen. The lane controller 22 controls the attack reservation lane displayed on the screen. The attack reservation lane visually represents the attack sequence of the player's character or an enemy character that is reserved for attack. The "attack reservation" here is an example of an action reservation. An action reservation may include the reservation of defense, recovery, and the like, in addition to an attack reservation. Therefore, in addition to the attack reservation, the attack reservation lane can also visually represent the action sequence of the player's character or an enemy character for which defense or recovery has been reserved. The attack reservation lane will be described in detail below.

The attack reservation acceptance component 24 accepts an attack reservation for a character from the player and registers it in the attack reservation lane as discussed below. The attack execution component 26 performs attacks of characters registered in the attack reservation lane according to the execution sequence. The character attack by the attack execution component 26 will be discussed in detail below.

The screen display component 14 controls screen display of the game device 1 according to the progress of the game under the game execution component 12. The display information storage component 16 stores display information (discussed below). The character information storage component 17 stores character information (discussed below). The lane information storage component 18 stores lane information (discussed below).

Client Terminal and Game Server Device

Figure 5:
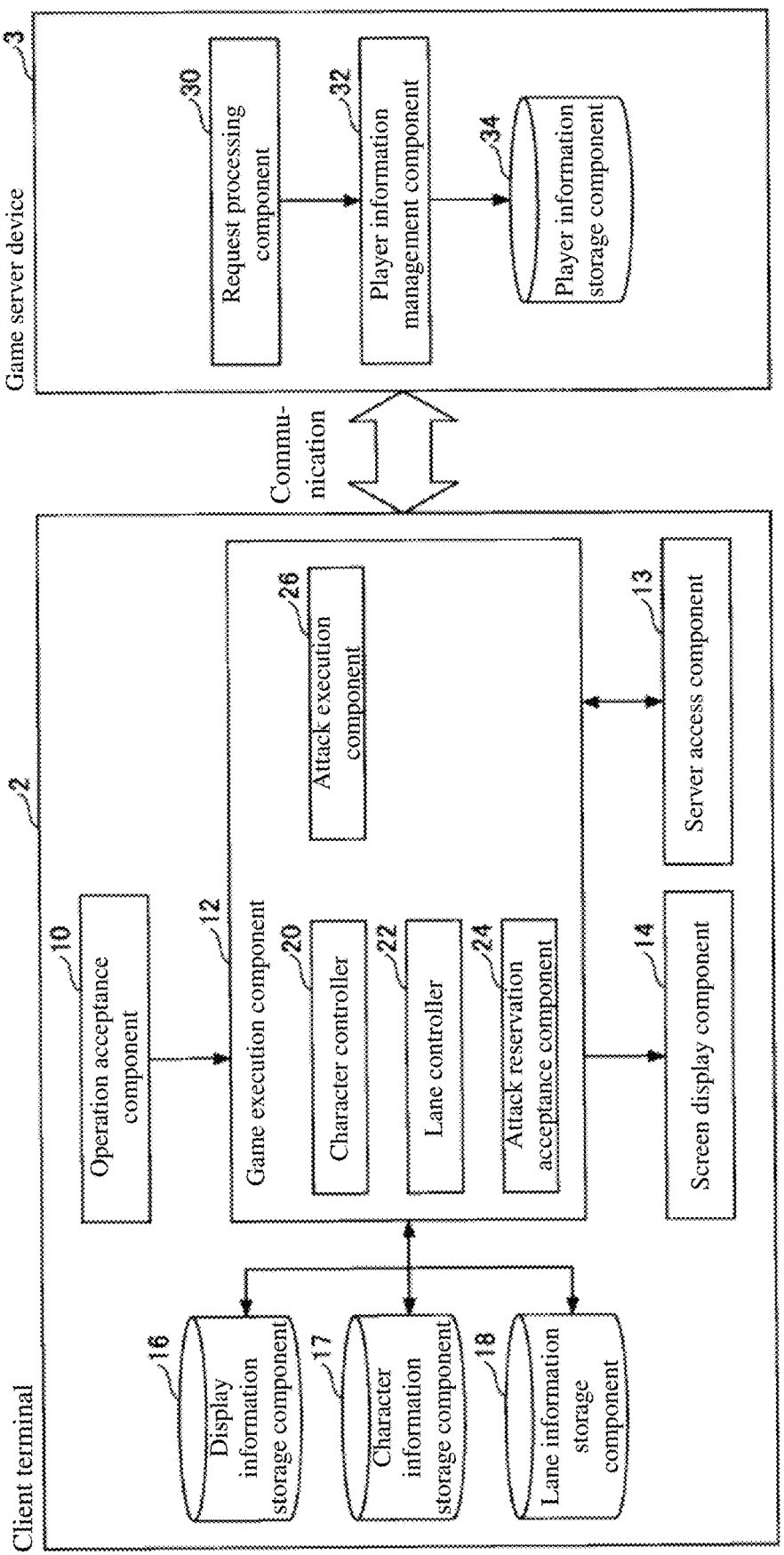
FIG. 5 is a processing block diagram of an example of the game server and a client terminal according to one or more embodiments of the present invention.

The client terminals 2 and the game server 3 in FIG. 1B are realized by the processing blocks shown in FIG. 5, for example. FIG. 5 is a processing block diagram of an example of the client terminal and the game server according to one or more embodiments of the present invention.

The client terminal 2 executes a program to realize the operation acceptance component 10, the game execution component 12, a server access component 13, the screen display component 14, the display information storage component 16, the character information storage component 17, and the lane information storage component 18. Also, the game execution component 12 is configured to have the character controller 20, the lane controller 22, the attack reservation acceptance component 24, and the attack execution component 26. The client terminal 2 in FIG. 5 has a configuration in which the server access component 13 is added to the configuration of the game device 1 in FIG. 4. When access to the game server 3 becomes necessary in the course of the processing by the game execution component 12, the server access component 13 sends a request to the game server 3, and receives the processing result or other response from the game server 3.

The game execution component 12 may be a browser type, which performs processing related to the game on the basis of page data written in HTML (Hyper Text Markup Language) or the like from the game server 3, scripts included in page data, and so forth. Or, the game execution component 12 may be an application type, which performs processing related to the game on the basis of an installed application. FIG. 5 shows an application type as an example.

A request processing component 30 of the game server 3 receives a request from a client terminal 2, performs processing corresponding to the request, and sends the processing result, etc., to the client terminal 2 as a response. The player information management component 32 stores various kinds of information about the player playing the game, as player information in the player information storage component 34. A player information management component 32 refers to and updates the player information in response to a request from the request processing component 30. A player information storage component 34 stores player information. For example, the player information storage component 34 stores information related to billing and information that needs to be shared by a plurality of client terminals 2.

The layout of the processing blocks shown in FIG. 5 is an example. For instance, the layout of processing blocks between the client terminal 2 and the game server 3 shown in FIG. 5 may be such that the game execution component 12, the display information storage component 16, the character information storage component 17, and the lane information storage component 18 are disposed in the game server 3. In this case, the client terminal 2 makes various requests to the game server 3 when a request to the game server 3 becomes necessary because of the operation accepted from the player by the operation acceptance component 10. The game execution component 12 of the game server 3 performs processing related to the game in response to various requests from the client terminal 2 and responds to the client terminal 2 by providing the processing result for allowing the game to proceed.

The client terminal 2 receives from the game server 3 a processing result for allowing the game to proceed as a response to various requests, and causes the game to proceed according to this processing result. The screen display component 14 controls screen display according to progress of the game.

(Processing)
(Battle Screen)

Figure 6:
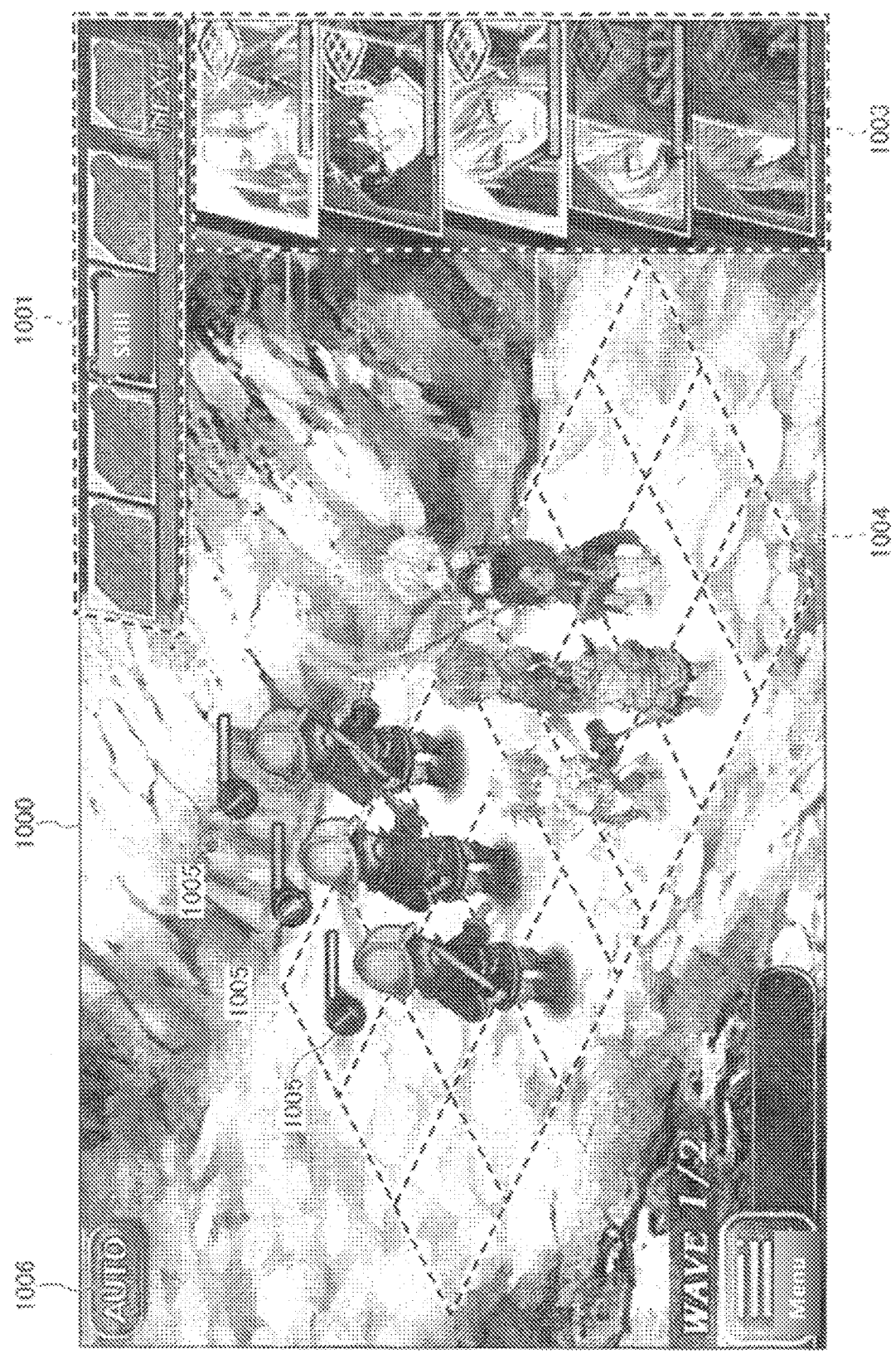
FIG. 6 is a simulation of an example of a battle screen according to one or more embodiments of the present invention.

The battle screen according to one or more embodiments of the present invention is as shown in FIG. 6, for example. FIG. 6 is a simulation of an example of a battle screen pertaining according to one or more embodiments of the present invention. On the battle screen 1000 shown in FIG. 6 are displayed an attack reservation lane 1001 and a panel 1003 in which face pictures of a player's characters (hereinafter referred to as player characters) are displayed, and a character layout box 1004 in which player characters and an enemy's characters (hereinafter referred to as enemy characters) are disposed.

In the character layout box 1004 of the battle screen 1000, the layout sites of the player characters and the enemy characters are indicated by a 3×3 grid. The player characters are disposed in the 3×3 layout site on the right side of the character layout box 1004. The enemy characters are disposed in the 3×3 layout site on the left side of the character layout box 1004. The player characters and the enemy characters are laid out so as to face each other on the layout site of the character layout box 1004. In FIG. 6, there are five player characters and three enemy characters. Characters borrowed from another player (so-called helper characters) may be included among the player characters.

The panel 1003 in which the face pictures of the player characters are displayed is a button, and operations for the various player characters can be accepted from the player. On the upper right of the panel 1003 of each player character is shown the attack range of that player character. The attack range of each player character will be described in detail below.

The player characters and enemy characters can be in an active state of accepting an attack reservation or an inactive state of not accepting an attack reservation. The player characters and the enemy characters change from the inactive state to the active state when a specific length of time set for each player character and enemy character has elapsed. Also, the player characters and the enemy characters return to their inactive state when an attack reservation is accepted, and again change from the inactive state to the active state when the specific length of time elapses. The specific length of time after which the inactive state changes to the active state will vary for each player character and enemy character, and can be set by parameters such as quickness set for each player character or enemy character, for example.

The attack reservation of an enemy character is performed in accordance with the timing of the attack reservation generated by the game execution component 12 in the case of a computer-versus-computer battle performed by the CPU 406, for example. In the case of a person-versus-person battle performed by another player, for example, the attack reservation of an enemy character is performed in accordance with the timing of the attack reservation transmitted from the other game device 1. The game execution component 12 compares the timing of the attack reservation for a player character made by a player with the timing of the attack reservation for an enemy character made by another player or the CPU 406, and determines the order of registration in the attack reservation lane 1001.

The timing at which a player character changes from an inactive state to an active state can be represented by a change in the color of the face picture corresponding to each player character in the panel 1003.

In FIG. 6, the overall brightness of the face pictures of the player characters in an inactive state is reduced, and a portion of the original brightness is gradually increased over time so as to return to the overall brightness of the face pictures at the timing when a specific length of time set for each player character has elapsed, which indicates to the player the timing of the change to the active state. As a display method in which a portion of the original brightness is gradually increased over time, it is conceivable for a portion of the original brightness to be increased from left to right, from top to bottom, from the edges to the center, etc.

The timing at which an enemy character changes from an inactive state to an active state is represented by a change in color of the weapon symbol 1005 displayed at the top of an enemy character disposed in the character layout box 1004. For instance, the weapon symbol 1005 can change color between blue, yellow, and red so that the color of the weapon symbol 1005 becomes red at the point when the specific length of time set for each enemy character has elapsed.

The way of expressing the timing when an enemy character changes from an inactive state to an active state is not limited to a change in the color of the weapon symbol 1005. The point when an enemy character changes from an inactive state to an active state may be represented by the weapon symbol 1005 filling up with water, or by a countdown effect, for example.

A player character in an active state accepts a request for an attack reservation by means of an operation (such as a tap) on the panel 1003 from the player. A player character in an active state that has accepted a request for an attack reservation from the player is reserved for attack by being registered in the panel (reservation slots) flowing from right to left in the attack reservation lane 1001.

Similarly, an enemy character in an active state is also reserved for attack by being registered in the panel flowing from right to left in the attack reservation lane 1001. An enemy character in an active state is reserved for attack by being registered in the panel on the attack reservation lane 1001 at the timing set by the program, for example.

Figure 7:
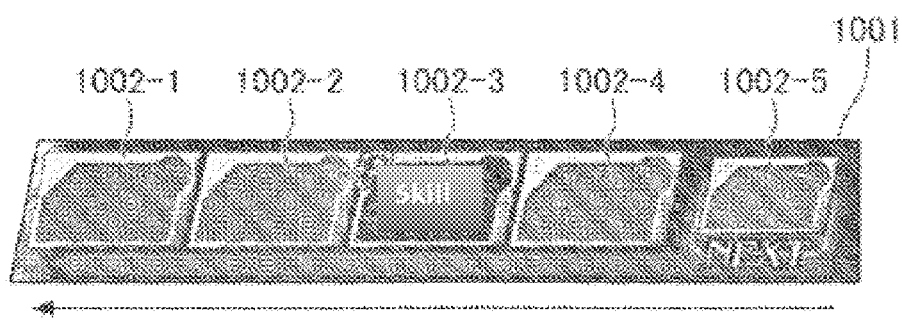
FIG. 7 is a diagram illustrating an example of an attack reservation lane according to one or more embodiments of the present invention.

The attack reservation lane 1001 will be described in detail through reference to FIG. 7. FIG. 7 is a diagram illustrating an example of an attack reservation lane. Panels 1002-1 to 1002-5 are displayed flowing from the right to the left in the attack reservation lane 1001 in FIG. 7.

The player character or enemy character registered on the far left side of the panel 1002-1 attacks. That is, in the example in FIG. 7, the player characters or enemy characters registered in the panels 1002-2 to 1002-4 attack in order. The panel 1002-5 represents a type of panel that can be registered next, and no player character or enemy character is registered in the panel 1002-5. In the example in FIG. 7, the player can recognize that the panel that can be registered next is an empty panel (without any effect).

The face pictures of the player characters or enemy characters reserved for attack are displayed in the panels 1002-1 to 1002-4 in the attack reservation lane 1001. Thus, the attack reservation lane 1001 visually represents the attack sequence of the player characters and enemy characters.

Also, some of the panels 1002-1 to 1002-5 in the attack reservation lane 1001 are associated with some kind of effect. In the example in FIG. 7, a "skill" panel 1002-3 capable of activating a skill is displayed. Hereinafter, when referring to any of the panels 1002-1 to 1002-5 indiscriminately, it will be referred to simply as a panel 1002.

The effect shown by a panel 1002 can be obtained at the point when the player character or enemy character registered in the panel 1002 attacks. For example, a player character for which it has become possible to activate a skill by performing an attack registered in the "skill" panel 1002-3 accepts a request for a skill activation reservation by means of an operation (such as a swipe) from the player that is different from a request for an attack reservation on the panel 1003.

The effect associated with a panel 1002 includes not only the effect of enabling a skill to be activated, but also, for example, acquisition of skill points for activating a skill, an increase in temporary or permanent attack strength and defense strength, a change in strength recovery or other such parameters. Also, the effect associated with a panel 1002 may be one in which the player character or enemy character registered in the panel 1002 cuts in at the far left or another such change to the attack sequence, one that activates a particular effect when the attack characteristics (attributes) set for each character match the attack characteristics set in the panel 1002, or one that expands the attack range of the player character or enemy character registered in the panel 1002. In addition, the effect associated with a panel 1002 may be one that changes the parameters of enemy characters, such as lowering the attack strength or the defensive strength of an enemy character.

Furthermore, a continuous attack (a so-called combo) can be activated by continuously registering player characters in the panel 1002 of the attack reservation lane 1001. During a combo, for example, it may be possible to activate an effect that is advantageous for a player, such as an attack boost or an additional attack. If the continuous registration of player characters to the panel 1002 is broken up by registration of an enemy character to the panel 1002 of the attack reservation lane 1001, the combo ends at the point when that enemy character attacks. Also, if it is determined that continuous registration of attack reservation by player characters has been broken up by the registration of a defense reservation or recovery reservation to the panel 1002 of the attack reservation lane 1001, the combo ends at the point when that defense or recovery is performed.

A player who wishes to attack even slightly sooner than an enemy character registers the attack reservation as soon as the player character becomes active so as to obtain the highest number of attacks. On the other hand, since player characters go into an active state at different times, if a player character that has become active is reserved for an attack right away, an enemy character may be registered in between attacks of player characters, so that the combo is not properly linked. In view of this, a combo of the full number of characters can be generated by waiting for all player characters to become active while enduring attacks by enemy characters, and then registering attack reservations for player characters continuously.

Thus, depending on the function of the combo, the player needs to determine whether to register the attack reservation right away or to aim for a combo and wait without registering an attack reservation, and the action reservation that is more strategic can be accepted.

Going back to FIG. 6, the "AUTO" button 1006 provided at the upper left of the battle screen 1000 is a button for changing to automatic mode, in which a player character that enters in an active state is automatically registered in the panel 1002 on the attack reservation lane 1001. The player can automate the battle by pressing the "AUTO" button 1006. Since automation eliminates the need for a player's intervention, the player can play more easily, but as described above, since the player character ends up being registered as soon as it enters in an active state, it is harder for combos to be linked. The player can end the battle by knocking down all the enemy characters on the battle screen 1000.

Battle Processing

Figure 8:
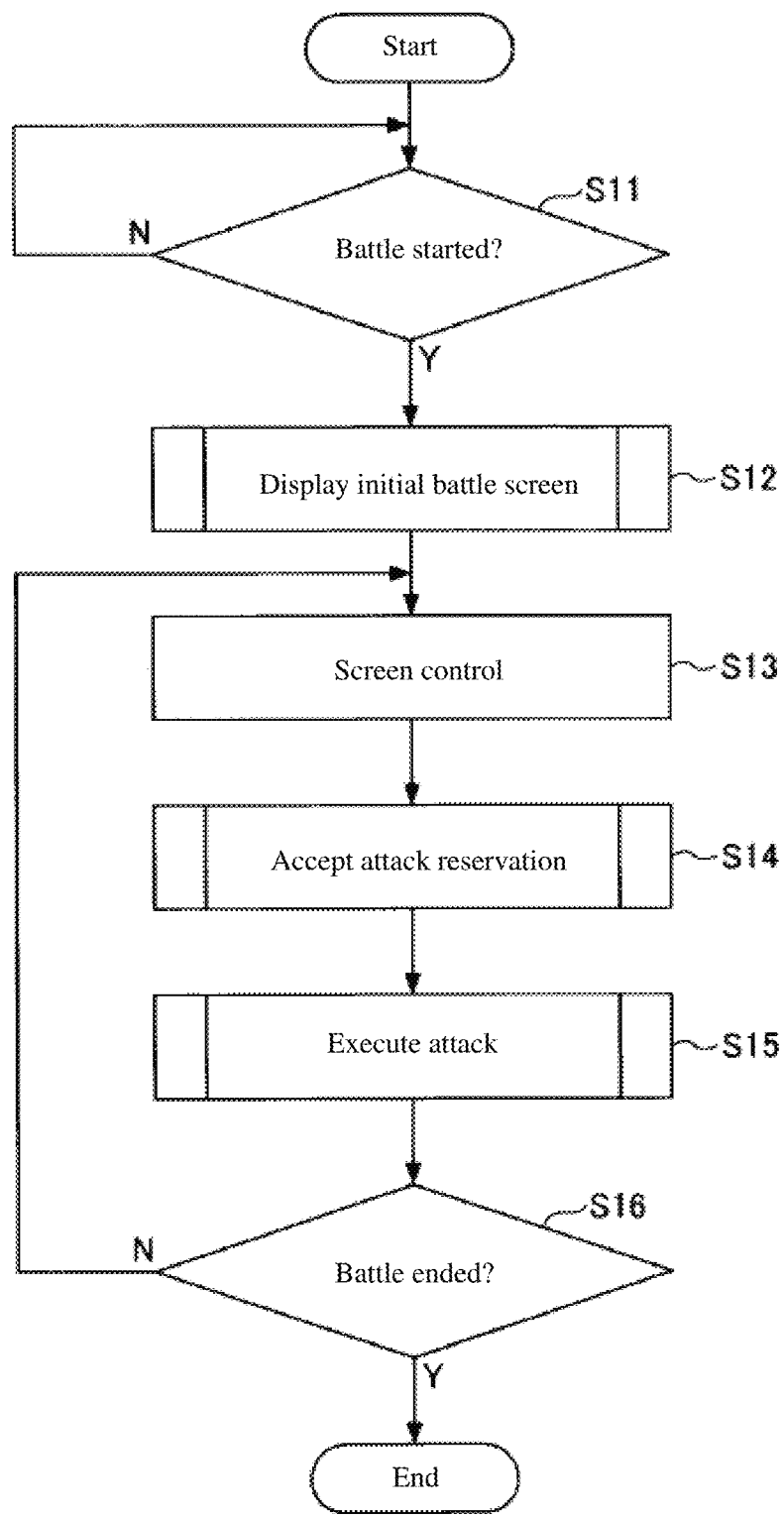
FIG. 8 is a flowchart of an example of battle processing according to one or more embodiments of the present invention.

The battle processing according to one or more embodiments of the present invention is performed, for example, in the procedure shown in FIG. 8. FIG. 8 is a flowchart of an example of a battle processing pertaining according to one or more embodiments of the present invention. The battle processing in the game device 1 in FIG. 4 will be described as an example, but the battle processing in the information processing system in FIG. 5 is the same, except for the communication between the client terminal 2 and the game server 3.

In step S11, the game execution component 12 of the game device 1 starts the processing from step S12 onward when a battle occurs in the game. In step S12, the game execution component 12 performs initial battle screen display processing, and displays the initial battle screen 1000 shown in FIG. 6.

In step S13, the game execution component 12 performs processing related to the game and causes the game to proceed. For example, the character controller 20 of the game execution component 12 starts counting (timing) a specific length of time for player characters and enemy characters, and controls display of the active state and inactive state of the player characters and enemy characters.

In step S14, the lane controller 22 and the attack reservation acceptance component 24 of the game execution component 12 perform attack reservation acceptance processing (discussed below), and register a player character or an enemy character in a panel on the attack reservation lane 1001. In step S15, the attack execution component 26 of the game execution component 12 performs attack execution processing of the player character or the enemy character registered in the panel at the far left.

In step S16, if the battle has not ended, the game execution component 12 returns to step S13 and continues the processing. If the battle has ended, the game execution component 12 ends the battle processing in FIG. 8.

Initial Battle Screen Display Processing

Figure 9:
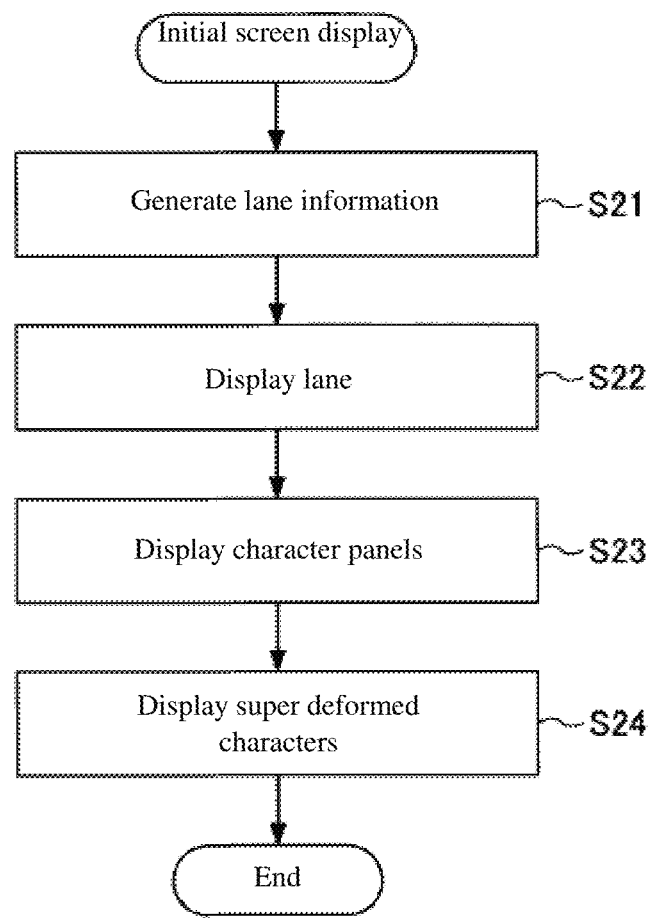
FIG. 9 is a flowchart of an example of initial battle screen display processing according to one or more embodiments of the present invention.

The initial battle screen display processing of step S12 shown in FIG. 8 is performed by the procedure shown in FIG. 9, for example. FIG. 9 is a flowchart of an example of the initial battle screen display processing.

In step S21, the lane controller 22 generates lane information. FIG. 10 is a configuration diagram of an example of lane information. The lane information shown in FIG. 10 has data categories of lane panel ID, effects, execution sequence, and registered character ID.

The lane panel ID is identification information for uniquely identifying the panels in the attack reservation lane 1001. The effect is effect information representing the effect had by the panel specified by the lane panel ID. The effect information in a panel with no effect is blank. The effect had by a panel may be set randomly or may be set according to a specific rule.

The execution sequence is execution sequence information indicating the execution sequence of the panels specified by the lane panel ID. For example, the execution sequence information starts from "5" and decreases by 1 each time an attack by a player character or enemy character is executed. The player character or enemy character registered in the panel whose execution sequence information is "1" attacks next.

The registered character ID is the character ID of the player character or enemy character registered in the panel specified by the lane panel ID. The initial battle screen display processing is processing before a player character or enemy character is registered in the panel. Therefore, the registered character ID is blank for the lane information generated in step S21.

In step S22, the lane controller 22 displays the attack reservation lane 1001 on the initial battle screen 1000 and displays the panel using the lane information generated in the attack reservation lane 1001.

In step S23, the character controller 20 displays the panel 1003 on which the face pictures of player characters are displayed on the initial battle screen 1000 by using the display information shown in FIG. 11. FIG. 11 is a configuration diagram of an example of display information. The display information in FIG. 11 has data categories of character ID, image ID, mini character image ID, character panel position, grid position, active state start time, and skill count.

The character ID is identification information for uniquely identifying a player character or enemy character. The image ID is identification information for uniquely identifying an image of a face picture of a player character or enemy character specified by a character ID. Mini character image ID is identification information for uniquely identifying an image of a whole body (mini character image) of a player character or enemy character specified by a character ID.

The character panel position is position information expressing the position on the panel 1003 where the face picture of the player character specified by the character ID is displayed. For example, a face picture of a player character whose character panel position is "1" is displayed at the top of the panel 1003.

The grid position is position information expressing the position of the character layout box 1004 where the player character or the enemy character specified by the character ID is displayed. The layout site in the character layout box 1004 can be uniquely specified by the grid position. The active state start time expresses the time at which the player character or enemy character specified by the character ID changes from an inactive state to an active state. The skill count is information indicating whether or not the player character specified by the character ID can activate a skill.

The character controller 20 can display the panel 1003 on which the face pictures of the player characters are displayed on the initial battle screen 1000 by using the character ID, image ID, and character panel position of the display information in FIG. 11. The attack range of each player character displayed at the upper right of the panel 1003 can be displayed using the character information shown in FIG. 12, for example.

FIG. 12 is a configuration diagram of an example of character information. The character information in FIG. 12 has data categories of character ID, attack characteristics, physical strength, attack strength, defensive strength, and quickness. The character ID is identification information for uniquely identifying a player character or enemy character. The attack characteristics are attack characteristic information expressing attack characteristics of a player character or enemy character, such as cutting, thrusting, striking, or the like. Attack ranges such as three squares laterally, three squares longitudinally, or four squares in a square shape are set for the attack characteristics. Therefore, the attack range of each player character displayed at the upper right of the panel 1003 can be displayed using the attack characteristic information of the character information.

The physical strength, attack strength, defensive strength, and quickness of the character information in FIG. 12 are information expressing the physical strength, attack strength, defensive strength, and quickness of a player character or enemy character. The attack characteristics, physical strength, attack strength, defensive strength, and quickness of the character information in FIG. 12 are examples of parameters of a player character or enemy character.

In step S24, the character controller 20 displays the mini characters in the character layout box 1004 of the initial battle screen 1000 using the display information shown in FIG. 11 and the character information as shown in FIG. 12.

The character controller 20 can display mini versions of the player characters in the character layout box 1004 of the initial battle screen 1000 by using the character ID, the mini character image ID, and the grid position of the display information in FIG. 11. Also, the character controller 20 can display mini versions of enemy characters in the character layout box 1004 of the initial battle screen 1000 by using the character ID, the mini character image ID, and the grid position of the display information in FIG. 11 and the attack characteristics of the character information in FIG. 12.

Attack Reservation Acceptance Processing

Figure 13:
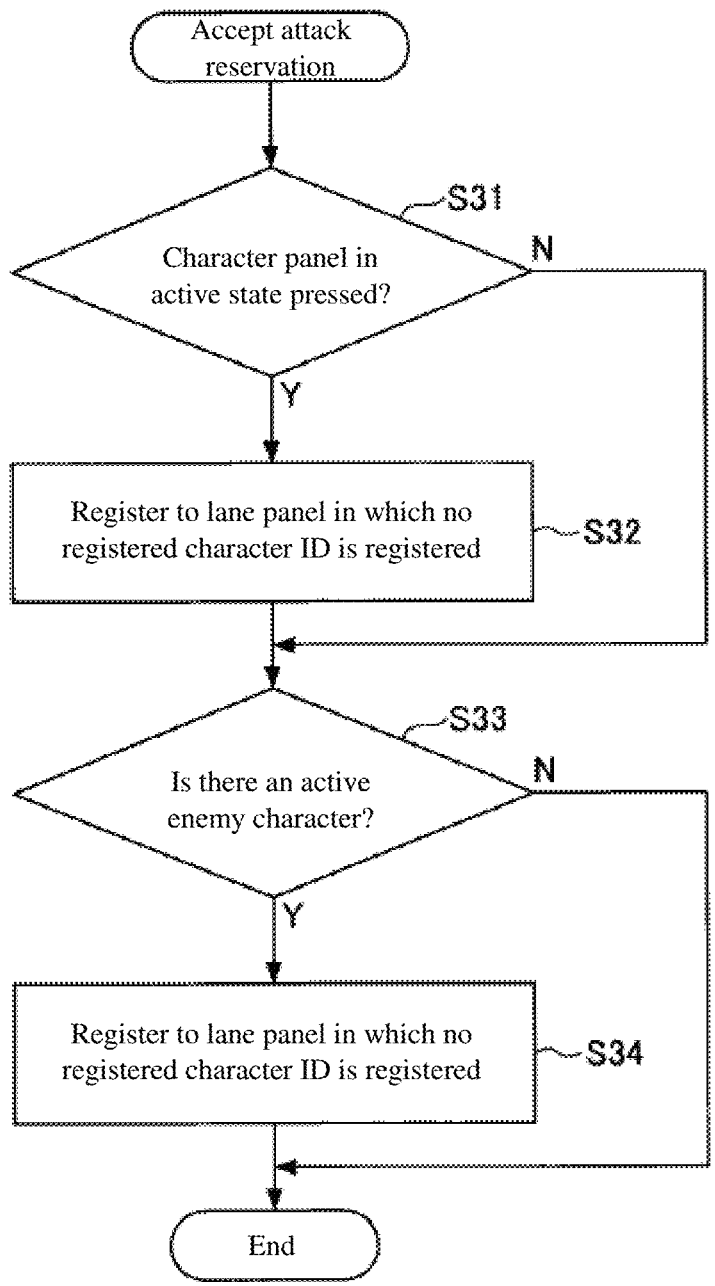
FIG. 13 is a flowchart of an example of attack reservation acceptance processing according to one or more embodiments of the present invention.

The attack reservation acceptance processing of step S14 shown in FIG. 8 can be performed, for example, by the procedure shown in FIG. 13. FIG. 13 is a flowchart of an example of attack reservation acceptance processing.

In step S31, the attack reservation acceptance component 24 of the game execution component 12 determines whether or not a request for attack reservation has been accepted by means of an operation such as tapping or pressing the panel (character panel) 1003 in which a face picture of an active player character is displayed.

If it is determined that the attack reservation accepting component 24 has accepted a request for attack reservation, the lane controller 22 refers to the lane information in FIG. 10 in step S32, and selects the panel with the lowest execution sequence out of the panels in the attack reservation lane 1001 in which no registered character ID is registered. The lane controller 22 then registers the character ID of the player character for which the request for attack reservation was accepted, to the registered character ID of the selected panel. If the attack reservation accepting component 24 determines that no request for attack reservation has been accepted, the lane controller 22 skips the processing of step S32.

In step S33, the attack reservation acceptance component 24 of the game execution component 12 determines whether or not there is an enemy character in an active state. If there is an enemy character in an active state, the lane controller 22 refers to the lane information in step S34 and selects the panel with the lowest execution sequence out of the panels in the attack reservation lane 1001 in which no registered character ID has been registered.

The lane controller 22 then registers the character ID of the enemy character in an active state to the registered character ID of the selected panel. If the attack reservation accepting component 24 determines that there is no enemy character in an active state, the lane controller 22 skips the processing of step S34.

The processing to register the character ID of an enemy character in an active state to the registered character ID of the lane information in step S34 may be performed immediately after an active state is entered, for example, or may be performed after a specific length of time has elapsed after entering an active state, or may be performed after waiting until the point at which a player's combo can be broken up, taking into account the effect of the panel and the player's combo on the attack reservation lane 1001.

Figure 14:
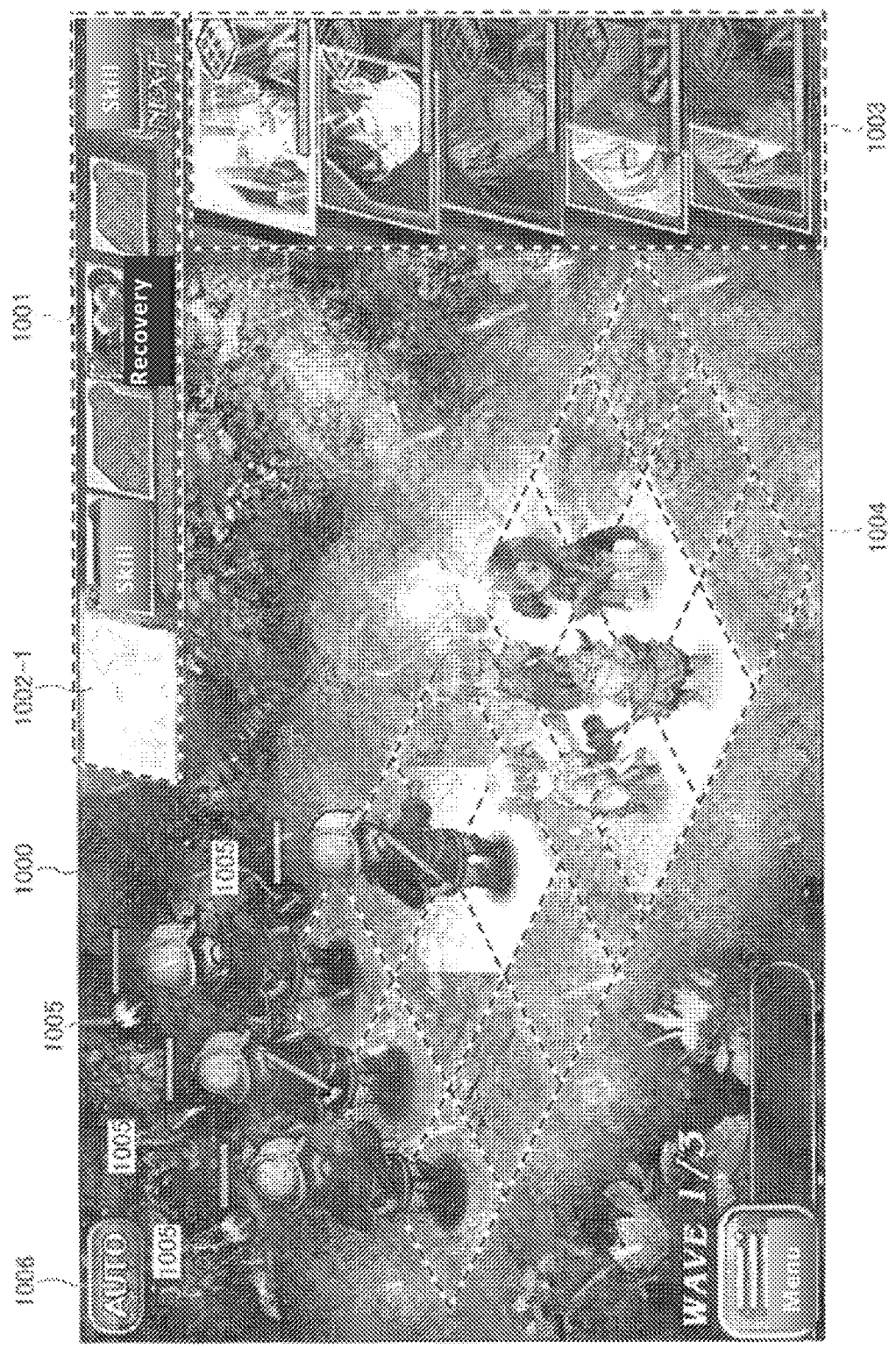
FIG. 14 is a simulation of an example of a battle screen in which face pictures of player characters reserved for attack are displayed in panels on the attack reservation lane according to one or more embodiments of the present invention.

As a result of the attack reservation acceptance processing in FIG. 13, face pictures of player characters or enemy characters reserved for attack are displayed in the panels on the attack reservation lane 1001 of the battle screen 1000. FIG. 14 is a simulation of an example of a battle screen in which face pictures of player characters reserved for attack are displayed in panels on the attack reservation lane. In the battle screen 1000 in FIG. 14, the face picture of the player character reserved for attack is displayed in the panel 1002-1 on the attack reservation lane 1001.

Figure 15:
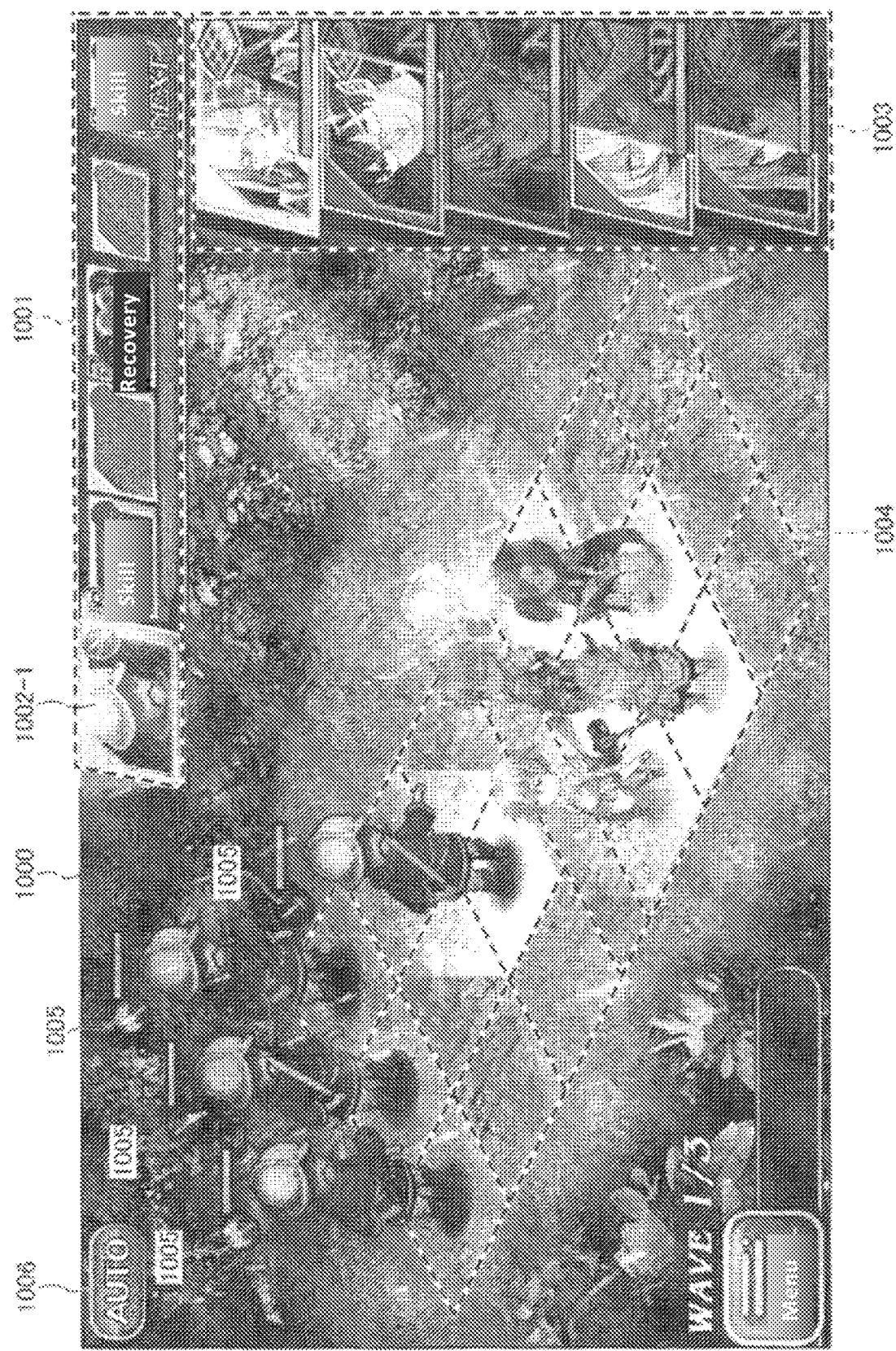
FIG. 15 is a simulation of an example of a battle screen in which face pictures of enemy characters reserved for attack are displayed in panels on the attack reservation lane according to one or more embodiments of the present invention.

Also, the face pictures of enemy characters reserved for attack are displayed as shown in FIG. 15, for example, in the panels on the attack reservation lane 1001 of the battle screen 1000. FIG. 15 is a simulation of an example of a battle screen in which face pictures of enemy characters reserved for attack are displayed in the panels on the attack reservation lane. In the battle screen 1000 in FIG. 15, the face picture of the enemy character reserved for attack is displayed in the panel 1002-1 on the attack reservation lane 1001.

Figure 16A:
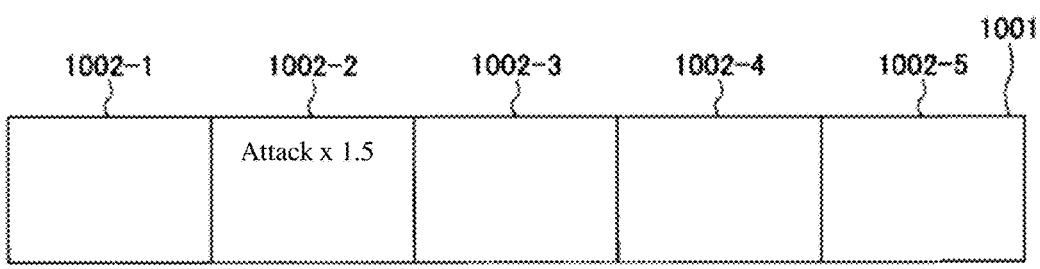
FIGS. 16A-16C are diagrams illustrating an example of how a player character is registered in a panel on the attack reservation lane according to one or more embodiments of the present invention.
Figure 16B:
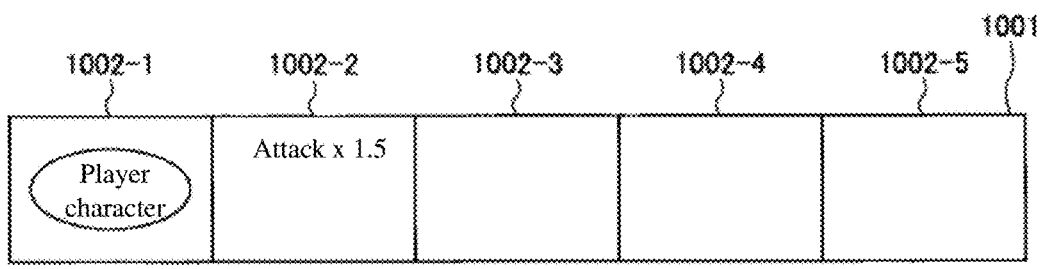
Figure 16C:
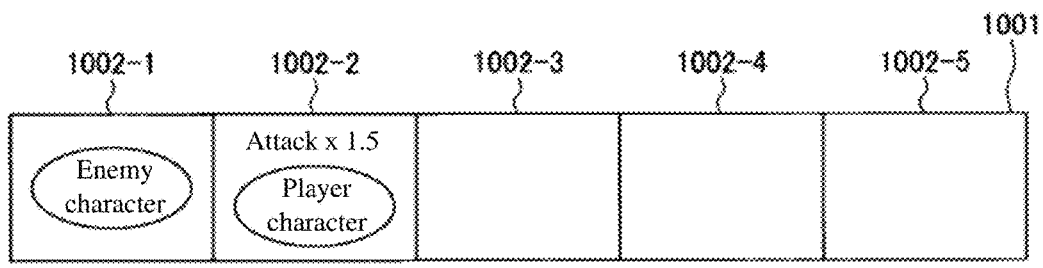

Strategy when Registering Player Characters in Panels on Attack Reservation Lane The strategy for registering player characters in the panels 1002 on the attack reservation lane 1001 will now be described. FIGS. 16A-16C are diagrams illustrating an example of how a player character is registered in a panel on the attack reservation lane.

FIG. 16*a* shows the state before player characters and enemy characters are registered in the panels 1002-1 to 1002-5 on the attack reservation lane 1001. The panel 1002-2 has the effect of boosting the attack strength by 1.5 times.

Therefore, by registering a player character in the panel 1002-2, the player can obtain the effect that the attack strength of the panel 1002-2 increases by 1.5 times. However, if the player makes a request for an attack reservation for a player character in an active state in the state in FIG. 16*a*, the player character will end up being registered in the panel 1002-1 as shown in FIG. 16*b*, and the effect of boosting the attack strength by 1.5 times had by the panel 1002-2 cannot be obtained.

In view of this, even if a player character enters an active state, the player can wait until an enemy character is registered in the panel 1002-1 as shown in FIG. 16*c*, and then make a request for an attack reservation for a player character in an active state, thereby registering the player character in the useful panel 1002-2 to advantageous effect.

Thus, the game device 1 according to one or more embodiments of the present invention does not involve the simple action of requesting an attack reservation right away when a player character enters in an active state, and it is necessary instead to request an attack reservation while taking into account the effect of the panels 1002-1 to 1002-5 on the attack reservation lane 1001. In other words, the game device 1 according to one or more embodiments of the present invention can realize acceptance of highly strategic attack reservations in which player characters and enemy characters vie for the useful panels 1002 on the attack reservation lane 1001.

Figure 17:
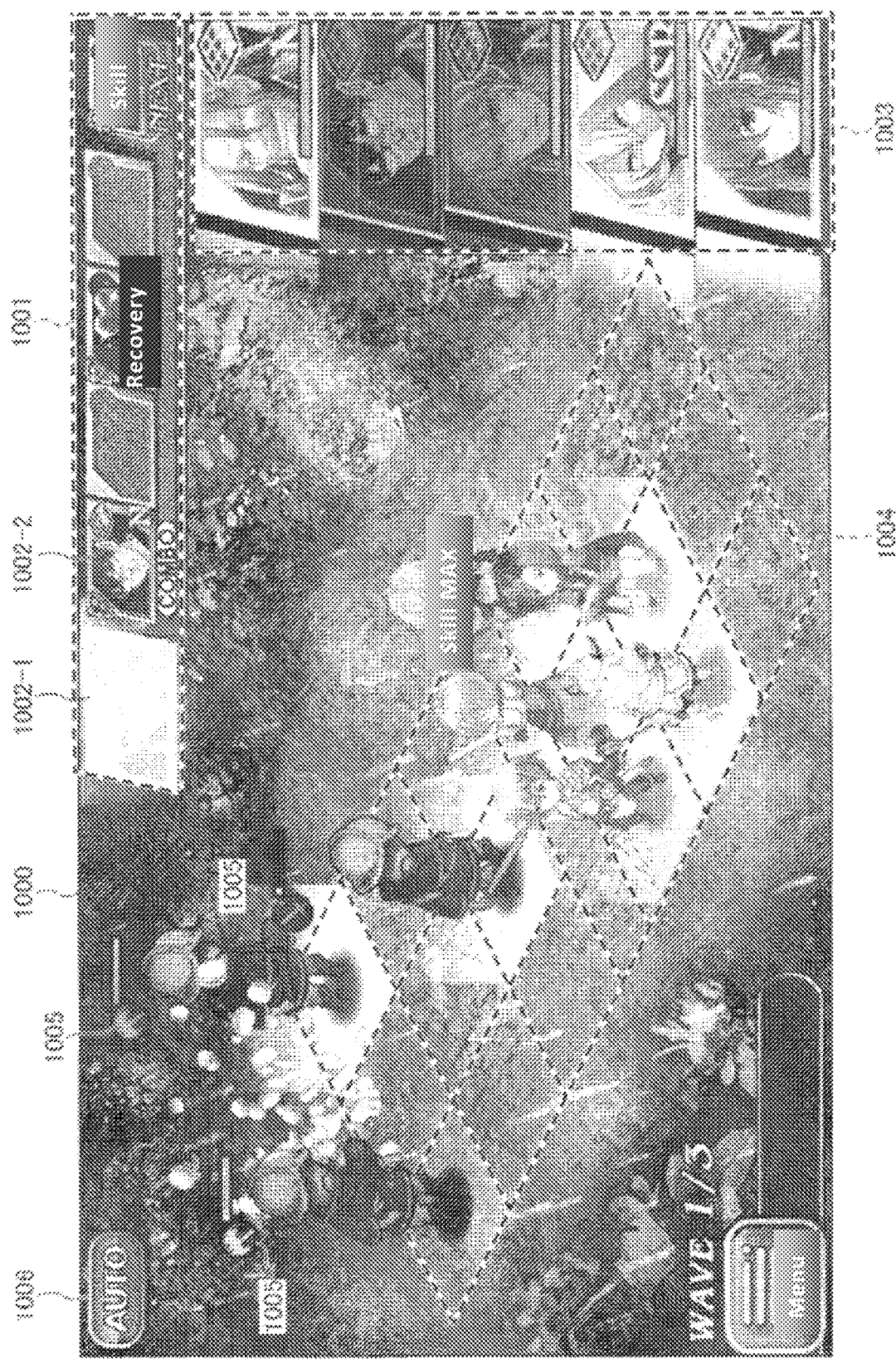
FIG. 17 is a diagram illustrating an example of how player characters are sequentially registered in panels on the attack reservation lane according to one or more embodiments of the present invention.

FIG. 17 is a diagram illustrating an example of how the player characters are continuously registered in panels on the attack reservation lane. In FIG. 17, in the state in which a player character has been registered in the panel 1002-1 on the attack reservation lane 1001, when a player character is registered in the panel 1002-2 following the panel 1002-1, the player character registered in 1002-2 activates a continuous attack (a so-called combo). Therefore, in FIG. 17, "COMBO" is displayed below the panel 1002-2 to indicate the activation of a combo. In the example in FIG. 17, "COMBO" is not displayed for the player character from which the combo starts.

When a combo is activated, the player character registered in the panel 1002-2 can activate an effect that is advantageous to the player, such as an attack boost or an additional attack. FIG. 17 shows an example in which player characters are registered in two consecutive panels 1002-1 and 1002-2 on the attack reservation lane 1001, but combos can also be linked by registering player characters continuously in three or more panels 1002.

Figure 18:
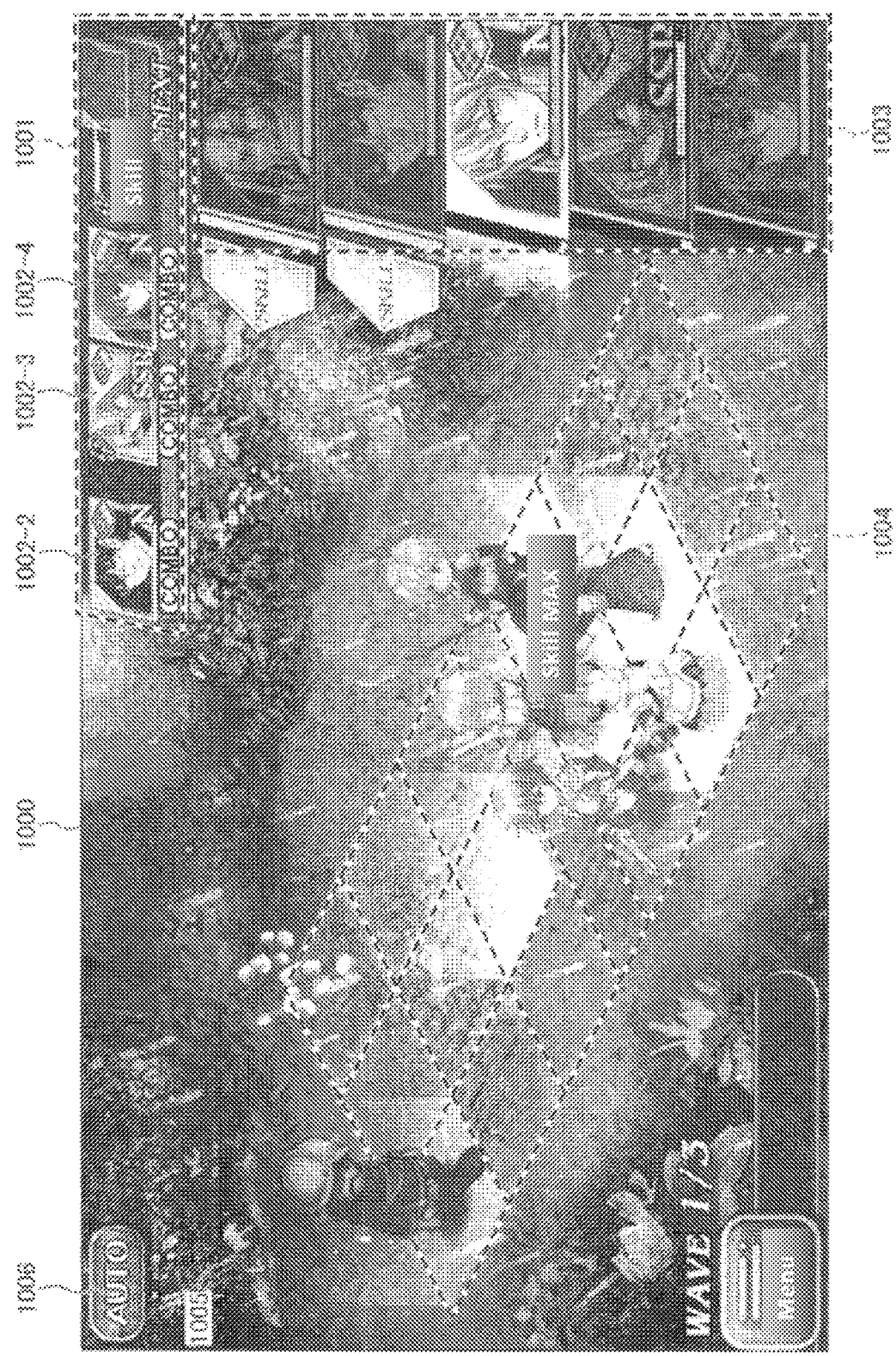
FIG. 18 is a diagram illustrating an example of how combos are linked according to one or more embodiments of the present invention.

FIG. 18 is a diagram illustrating an example of how combos are linked. FIG. 18 shows how player characters are continuously registered in the two panels 1002-3 and 1002-4 on the attack reservation lane 1001 from the state in FIG. 17.

In FIG. 18, when player characters are registered in the panels 1002-3 and 1002-4 following the panel 1002-2 in a state in which a player character is registered in the panel 1002-2 on the attack reservation lane 1001, the player characters registered in the panels 1002-3 and 1002-4 initiate a continuous attack (a so-called combo). Therefore, in FIG. 18, "COMBO" is displayed below the panels 1002-3 and 1002-4 to indicate combo activation. For example, the effect activated by a combo can be made more advantageous for the player as more combos are linked.

Figure 19:
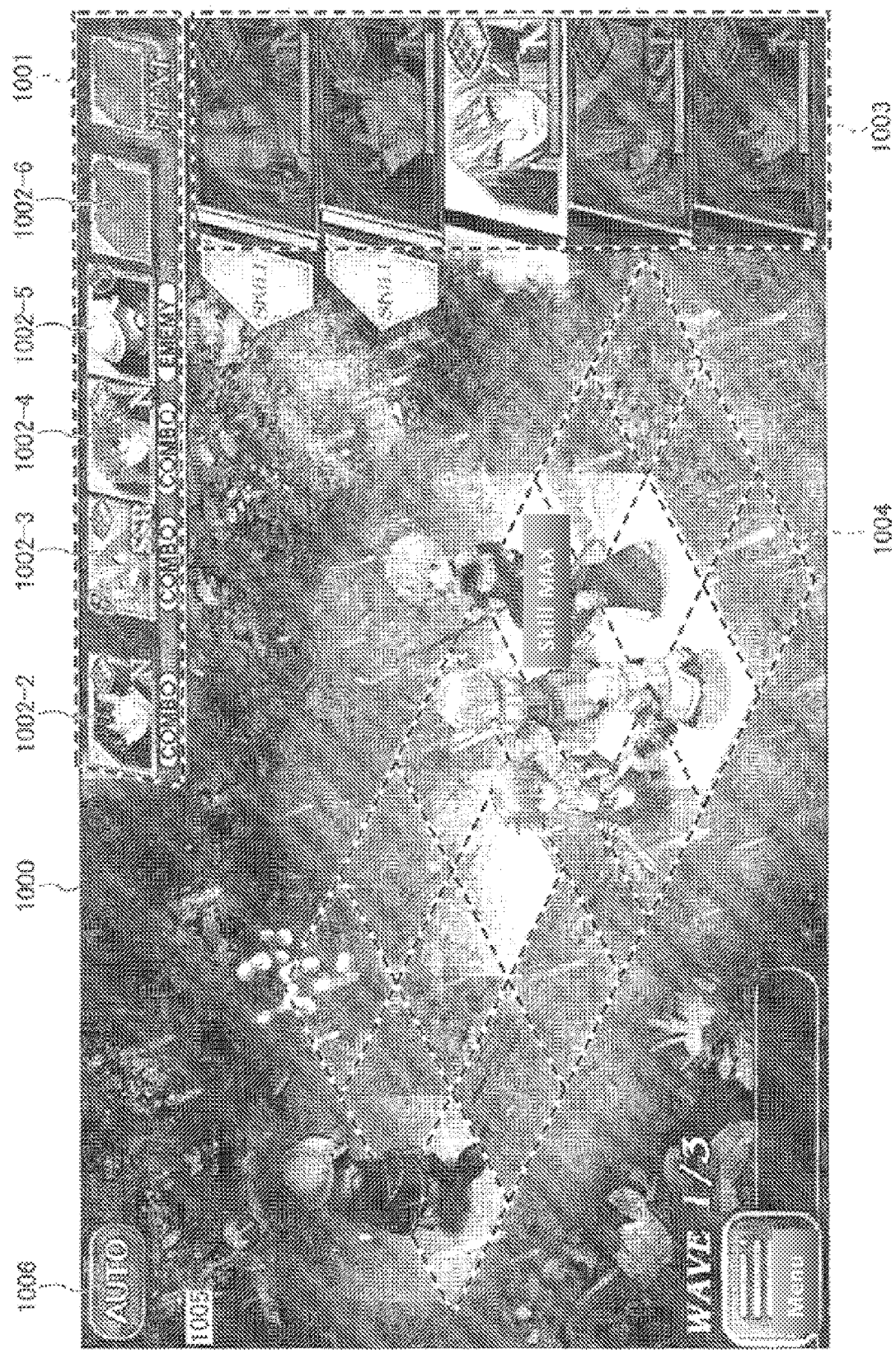
FIG. 19 is a diagram illustrating an example of how a combo is broken up according to one or more embodiments of the present invention.

FIG. 19 is a diagram illustrating an example of how a combo is broken up. FIG. 19 shows how an enemy character is registered in the panel 1002-5 on the attack reservation lane 1001 from the state in FIG. 18.

In FIG. 19, a combo is broken up due to an enemy character being registered in the panel 1002-5 following the panel 1002-4 in a state in which player characters are sequentially registered in the panels 1002-2 to 1002-4 on the attack reservation lane 1001.

Therefore, with the game device 1 according to one or more embodiments of the present invention, acceptance of a highly strategic attack reservation can be realized, with the player deciding whether to register player characters one after another in panels 1002 so that the combo will not be broken up by having an enemy character cut in, or to go ahead and register player characters to useful panels 1002 even though the combo may be broken.

It may be designed so that when the enemy character registered in the panel 1002-5 is vanquished before attacking in the state in FIG. 19, a combo may once again be linked up by deleting the panel 1002-5 and registering a player character in the panel 1002-6 following the panel 1002-5.

Furthermore, the game device 1 according to one or more embodiments of the present invention may be designed to allow cancellation of registration to the panels 1002. Acceptance of an attack reservation with an even higher level of strategy can be realized by putting a player character whose registration to the panel 1002 was cancelled in an active state. Also, the player characters registered in the panels 1002 at the end of a battle may be put in an active state right from the start in the next battle, or a bonus such as experience value may be awarded.

Thus, with the game device 1 according to one or more embodiments of the present invention, it is possible to realize a battle system with a high level of strategy in the game.

Attack Execution Processing

Figure 20:
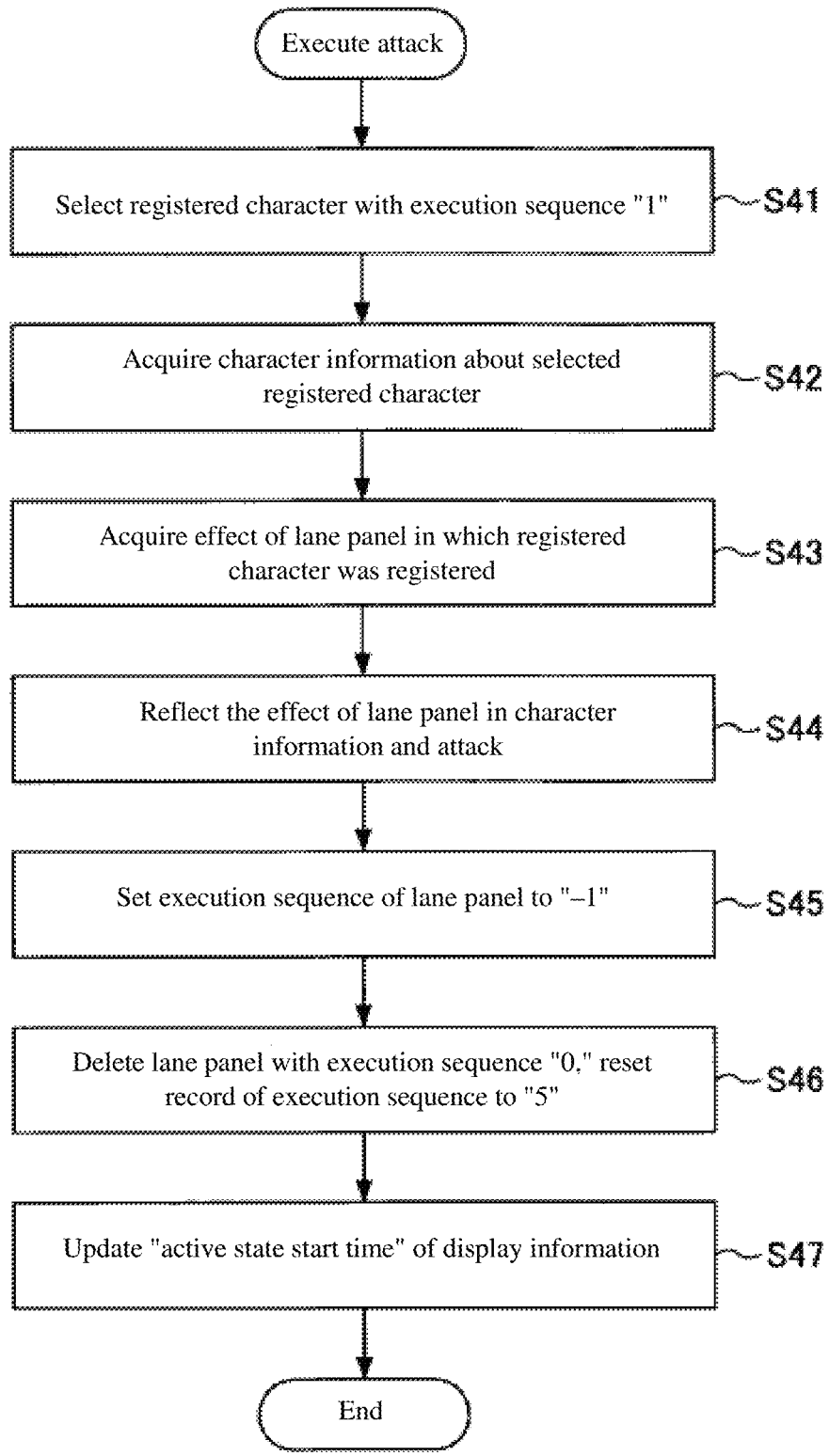
FIG. 20 is a flowchart of an example of attack execution processing according to one or more embodiments of the present invention.

The attack execution processing in step S15 shown in FIG. 8 is performed, for example, by the procedure shown in FIG. 20. FIG. 20 is a flowchart of an example of attack execution processing.

In step S41, the attack execution component 26 of the game execution component 12 refers to the lane information in FIG. 10 and selects the panel of the attack reservation lane 1001 corresponding to the execution sequence "1." The attack execution component 26 acquires the character ID of the player character or enemy character registered in the selected panel from the registered character ID of that panel.

In step S42, the attack execution component 26 refers to the character information in FIG. 12 and acquires character information corresponding to the character ID acquired in step S41. In step S43, the attack execution component 26 acquires the effect of the panel selected in step S41 from the lane information in FIG. 10.

When the effect of a panel is acquired in step S43, the attack execution component 26 in step S44 reflects the effect of the panel in the character information acquired in step S42. The attack execution component 26 then proceeds to step S44 and attacks the player character or enemy character registered in the panel, using the character information in which the effect of that panel is reflected.

If the effect of the panel could not be acquired in step S43, the attack execution component 26 performs an attack on the player character or enemy character registered in the panel using the character information acquired in step S42.

In step S45, the attack execution component 26 notifies the lane controller 22 that the attack of the panel corresponding to the execution sequence "1" has ended. The lane controller 22 sets the execution sequence of the lane information in FIG. 10 to "−1." In step S46, the attack execution component 26 deletes the record of the lane information in FIG. 10, in which the execution sequence turned to "0," and resets the record of the new execution sequence "5" to the lane information in FIG. 10.

The attack executing component 26 also deletes the record of lane information in which are registered player characters or enemy characters that became immovable midway through, and resets the record of the new execution sequence "5" to the lane information in FIG. 10.

In step S47, the attack execution component 26 notifies the character controller 20 of the character ID of the player character or enemy character that performed the attack. The character controller 20 refers to the display information in FIG. 11 and updates the active state start time corresponding to the character ID of the player character or enemy character that performed the attack.

The update of the active state start time is performed by using the "quickness" parameter of the character information of the player character or enemy character specified by the character ID. For example, for a player character or enemy character whose character information "quickness" is low, the time it takes to return from an inactive state to an active state is set longer. For a player character or an enemy character whose character information "quickness" is high, the time it takes to return from an inactive state to an active state is set shorter.

Figure 21A:
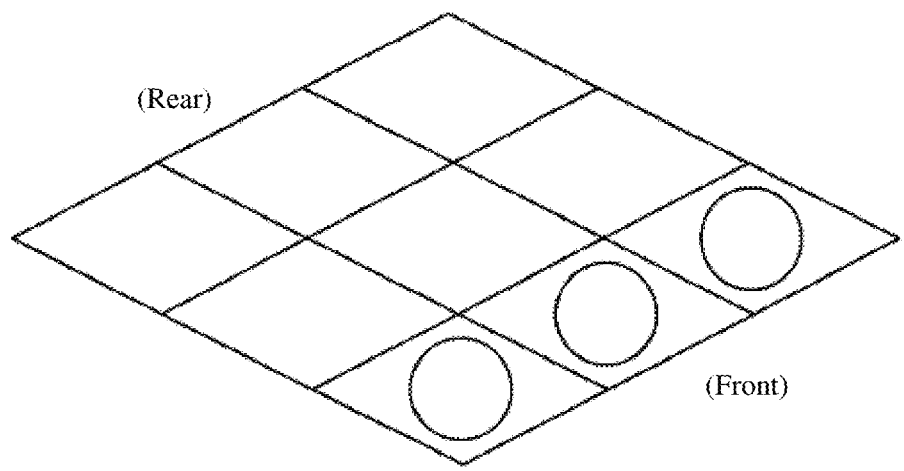
FIGS. 21A-21C are diagrams illustrating an example of an attack range of a player character or an enemy character according to one or more embodiments of the present invention.
Figure 21B:
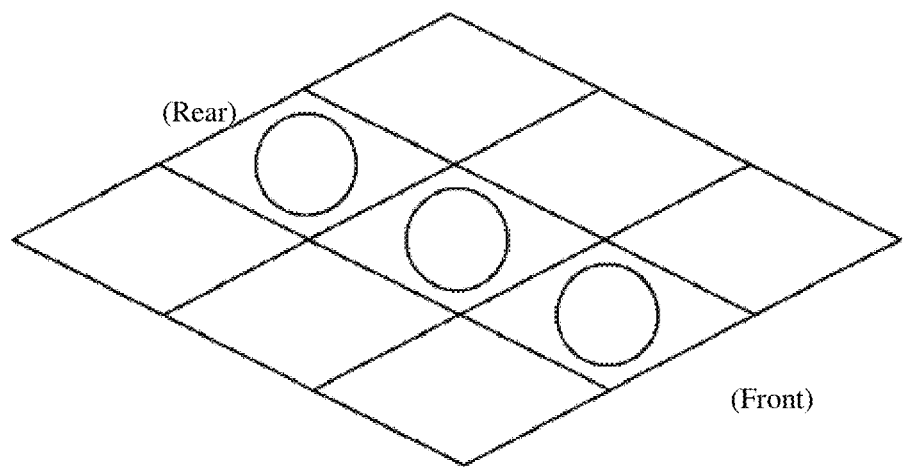
Figure 21C:
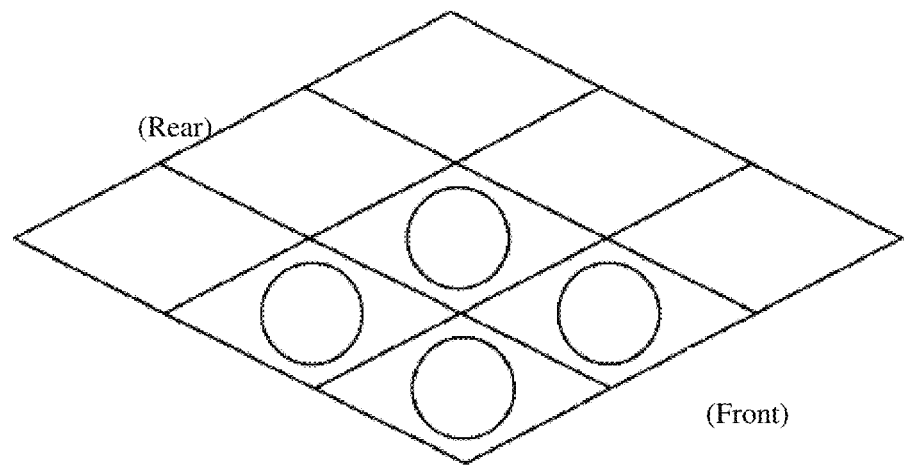

The attack by the player character or enemy character in step S44 is performed over the attack range set by the attack characteristic of the character information in FIG. 12. FIGS. 21A-21C are diagrams illustrating an example of the attack range of a player character or enemy character.

FIG. 21A shows an attack range of "three lateral squares" with circles when the attack characteristic is "cutting." FIG. 21B shows an attack range of "three longitudinal squares" with circles when the attack characteristic is "thrusting." FIG. 21C shows the attack range of "four squares in a square shape" with circles when the attack characteristic is "striking."

Thus, with the game device 1 according to one or more embodiments of the present invention, the attack range varies with the attack characteristics of the player character or enemy character. For example, on the battle screen 1000 in FIGS. 21A-21C, enemy characters are arranged in three longitudinal squares at the layout site of enemy characters in the character layout box 1004. In the case of the battle screen 1000 in FIGS. 21A-21C, only the enemy characters in the front row can be attacked in the attack range of "three lateral squares" when the attack characteristic is "cutting." However, in the attack range of "three longitudinal squares" when the attack characteristic is "thrusting," the enemy characters disposed in three longitudinal squares can be attacked all at once. With the game device 1 according to one or more embodiments of the present invention, there is more strategy involved because the attack characteristics that allow for an effective attack vary according to the layout of the enemy characters in the character layout box 1004.

By using such attack characteristics and combos, the game device 1 according to one or more embodiments of the present invention can also give the player the following advantages. While a combo is linked up, the game device 1 according to one or more embodiments of the present invention counts the hit value every time an enemy character is attacked, and boosts the attack strength to 1.1 times, 1.2 times, and so on. By combining a combo and an attack characteristic that allows a plurality of enemy characters to be attacked at once as described above, with the game device 1 according to one or more embodiments of the present invention, it is possible to count a greater hit value when attacking with one player character, and the attack strength while the combo is linked can be significantly increased.

Figure 22:
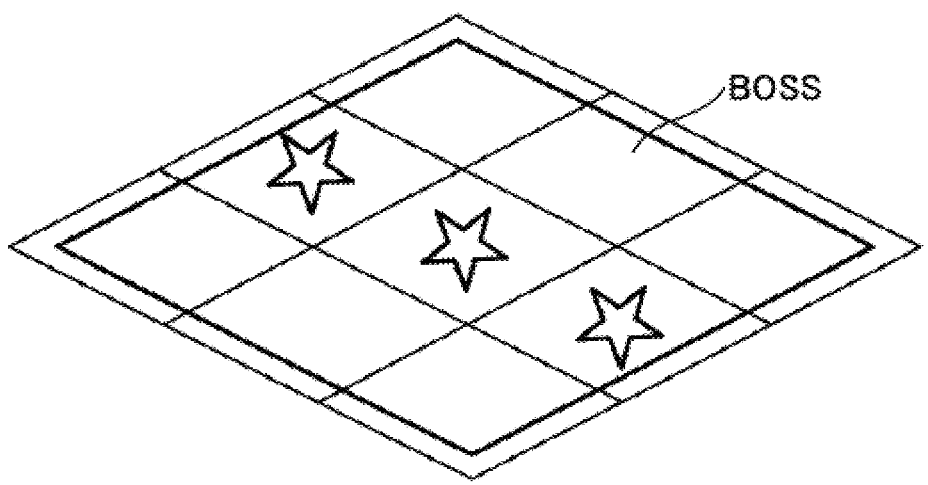
FIG. 22 is a diagram illustrating an example of an enemy character that performs hit determination at a plurality of positions according to one or more embodiments of the present invention.

Also, as shown in FIG. 22, even in the case of enemy characters such as bosses (BOSS) having hit determination in a plurality of positions indicated by stars, whether an attack by a player character is advantageous or disadvantageous will depend on the attack characteristics. Here, a boss has multiple hit determinations, but has only one physical strength value. For example, a mini character image for use with a single BOSS and having a hit determination in three longitudinal rows as indicated by stars in FIG. 22 is displayed. At this time, in the case of performing the attack of "cutting" shown in FIG. 21A, the attack range and hit determination have just "one square" in common, but on the other hand, in the case of performing the attack of "thrusting" shown in FIG. 21B, the attack range and hit determination have "three squares" in common. Consequently, even though the attack strength by either attack is the same, the amount of damage inflicted on the BOSS in one attack by "thrusting" is three times that of "cutting." Similarly, in the case of "striking," the attack range and hit determination have "two squares" in common, so "striking" inflicts twice the damage of "cutting." With the game device 1 according to one or more embodiments of the present invention, more strategy is involved because there are varied attack characteristics that allow effective attacks to be performed on large enemy characters, with which hit determination is performed at a plurality of places.

(Skill Activation)

Figure 23:
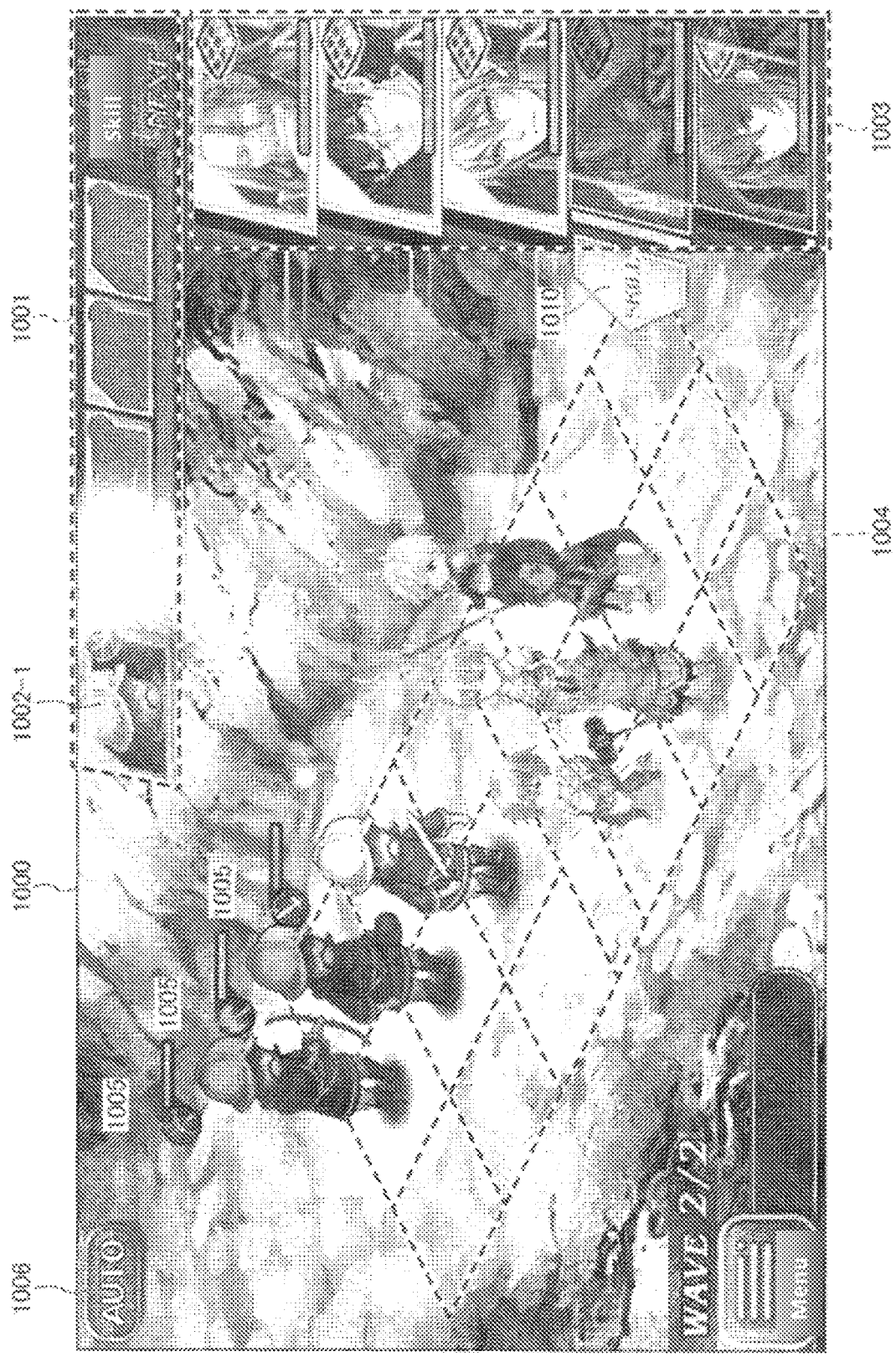
FIG. 23 is a simulation visually representing a player character that can activate a skill according to one or more embodiments of the present invention.

The activation of skills will now be described. FIG. 23 is a simulation visually representing a player character that can activate a skill. For example, as shown in FIG. 23, a skill symbol 1010 is displayed on the left side of a face picture on the panel 1003 of the player character for which a skill can now be activated.

Figure 24:
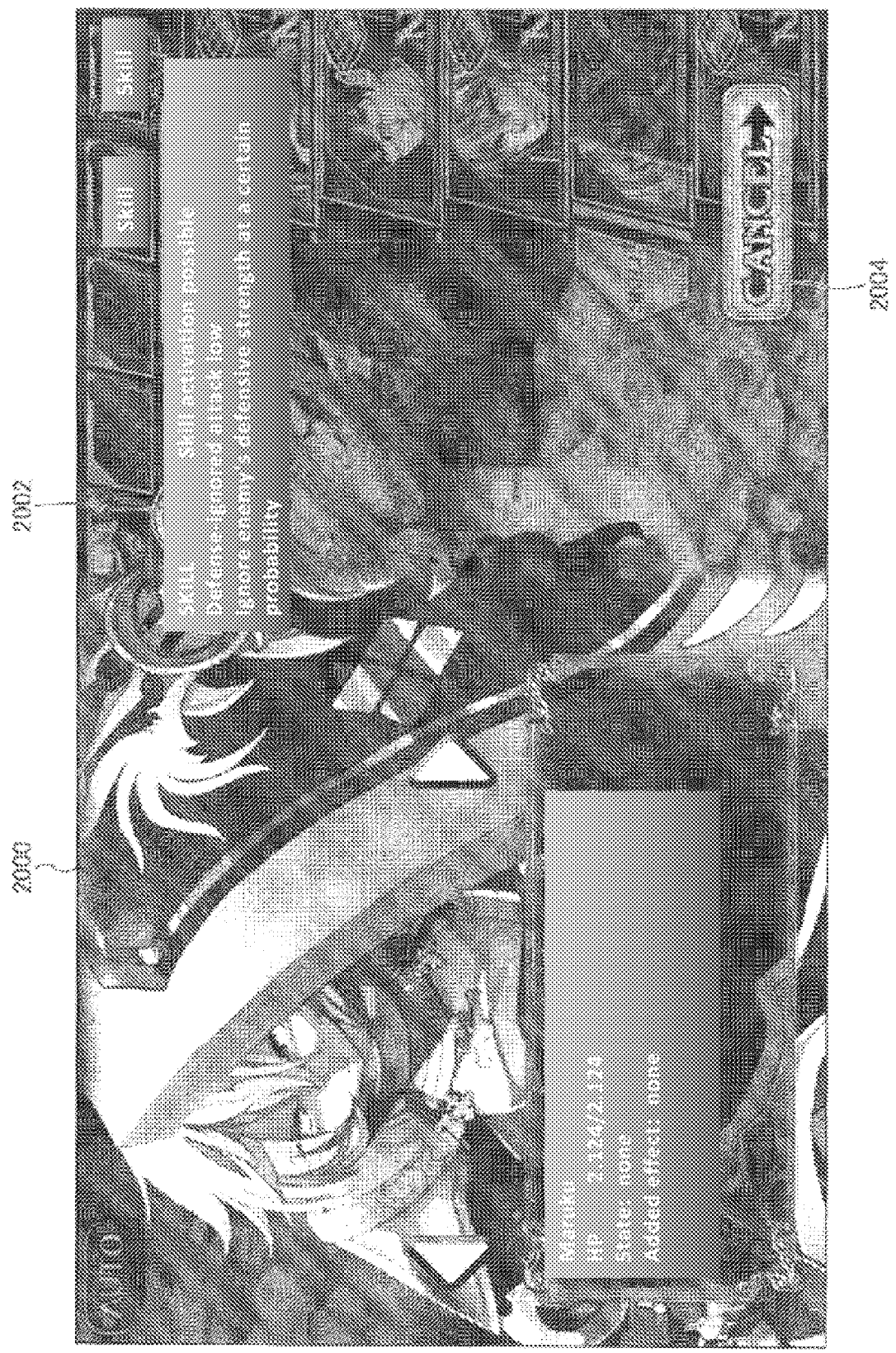
FIG. 24 is a simulation of an example of a skill activation screen.

The player can display a skill activation screen as shown in FIG. 24 by performing an operation for displaying a skill activation screen, such as a swipe, on the face picture on which the skill symbol 1010 is displayed. FIG. 24 is a simulation of an example of a skill activation screen. The skill activation screen 2000 in FIG. 24 includes a button 2002 for selecting skills that can be activated and a cancel button 2004 for returning to the battle screen 1000 in FIG. 23.

The player can request the activation of a skill by an operation (such as a tap) on the button 2002. As to the timing at which the skill is activated, it may be activated immediately or may be activated according to the panel of the attack reservation lane 1001.

In one or more embodiments of the present invention, an example was described in which an effective panel of the attack reservation lane 1001 is fought over with an enemy character in a battle occurring in the game, but an effective panel may instead fought over with player characters of other players.

In one or more embodiments of the present invention, it is possible to accept a highly strategic action reservation with tactics that take into consideration the effect had by a panel in a game in which an action sequence is fought over with opponent characters such as enemy characters and other player characters.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 Game Device
2 Client Terminal
3 Game Server Device
4 Network
10 Operation Acceptance Component
12 Game Execution Component
13 Server Access Component
14 Screen Display Component
16 Display Information Storage Component
17 Character Information Storage Component
18 Lane Information Storage Component
20 Character Controller
22 Lane Controller
24 Attack Reservation Acceptance Component
26 Attack Execution Component
30 Request Processing Component
32 Player Information Management Component
34 Player Information Storage Component
401, 501 Input Device
402, 502 Display
403, 503 External Interface
403a, 503a Recording Medium
404, 504 RAM
405, 505 ROM
406, 506 CPU
407, 507 Communication Interface
408, 508 HDD
409 Audio Input/Output Component
410 Battery
1000 Battle Screen
1001 Attack Reservation Lane
1002 Panel On Attack Reservation Lane
1003 Panel In Which Face Pictures Of Player Characters Are Displayed
1004 Character Layout Box
1005 Weapon Symbol
1006 "AUTO" button
B Bus

What is claimed is:

1. A terminal device comprising:
a memory that stores:
characters in a game;
a plurality of reservation slots into which action reservations for the characters are registered; and
an action sequence for each of the reservation slots;
a display that displays the characters associated with the reservation slots, according to the action sequence;
a receiver that receives a request for an action reservation for a first character input from a player; and
a processor connected to the memory, display, and the receiver and that outputs, to the memory, the request when the processor determines the first character is in an active state in which the character is allowed to register the action reservation,
wherein the memory registers the first character in an earliest reservation slot in the action sequence among the plurality of reservation slots in which no other characters have been registered,
wherein the processor causes the first character to execute an action for the first character associated with the reservation slot in accordance with the action sequence,
wherein the plurality of reservation slots includes:

a first reservation slot in which an effect has been set; and a second reservation slot in which the effect has not been set, wherein, when the reservation slot associated with the first character is the first reservation slot, the effect is applied to the executed action, wherein the effect is at least one of enabling a skill of the first character to be activated, increasing attack strength or defense strength of the first character, expanding an attack range, and changing strength recovery of the first character, wherein the effect is set in the first reservation slot before the first reservation slot is associated with the first character, and wherein the effect is applied to the action to be executed by the first character before the action is executed or simultaneously to when the action is executed.

2. The terminal device according to claim 1, wherein when the reservation slot is the first reservation slot, the processor causes the display to display the reservation slot and the effect associated with the reservation slot.

3. The terminal device according to claim 2, wherein, when the reservation slot is the second reservation slot, the processor causes the display to display the reservation slot without associating the reservation slot with the effect.

4. The terminal device according to claim 1, wherein the effect set in the reservation slot is an effect that gives an advantage to an action performed by the first character registered in that reservation slot.

5. The terminal device according to claim 1, wherein the processor manages whether each of the characters is in the active state in which each of the characters is allowed to register the action reservation.

6. The terminal device according to claim 1, wherein the processor causes the first character to execute the action of the first character to which an additional effect is applied, when the first character is continuously registered in the reservation slot in which the action sequence is continuous.

7. The terminal device according to claim 1,
wherein the receiver receives a request for an action reservation for a second character input from another player or a program of the game,
wherein the processor outputs, to the memory, the request when the processor determines the second character is in the active state, and
wherein the memory registers the second character in the earliest reservation slot in the action sequence among the plurality of reservation slots in which no other characters have been registered.

8. An information processing system that performs game processing comprising:
at least a terminal device comprising:
a display that displays information stored in a memory;
a transceiver; and
a processor connected to the memory, the display, and the transceiver; and
a server connected to via a network to the terminal device, the server comprising:
a memory that stores: characters in a game; a plurality of reservation slots into which action reservations for the characters are registered; and an action sequence for each of the reservation slots;
a transceiver that receives, from the terminal device of a player in a game, a request for action reservations for a first character in the game; and
a processor connected to the memory and the transceiver of the server and that outputs, to the memory of the server, the request when the processor determines the first character is in an active state in which the character is allowed to register the action reservation,
wherein the memory of the server registers the first character in an earliest reservation slot in the action sequence among the plurality of reservation slots in which no other characters have been registered, and
wherein the transceiver of the server transmits, to the terminal device, information that indicates the characters associated with the reservation slots and an instruction that causes the first character to execute an action for the first character associated with the reservation slot in accordance with the action sequence,
wherein the plurality of reservation slots includes:
a first reservation slot in which an effect has been set; and
a second reservation slot in which the effect has not been set,
wherein, when the reservation slot associated with the first character is the first reservation slot, the effect is applied to the executed action,
wherein when the transceiver of the server receives the information and the instruction,
the display displays the characters associated with the reservation slots according to the action sequence based on the received information, and
the processor of the server causes the first character to execute an action for the first character associated with the reservation slot in accordance with the action sequence,
wherein the effect is at least one of enabling a skill of the first character to be activated, increasing attack strength or defense strength of the first character, expanding an attack range, and changing strength recovery of the first character,
wherein the effect is set in the first reservation slot before the first reservation slot is associated with the first character, and
wherein the effect is applied to the action to be executed by the first character before the action is executed or simultaneously to when the action is executed.

9. The information processing system according to claim 8, wherein the processor of the server manages whether each of the characters is in the active state in which each of the characters is allowed to register the action reservation.

10. The information processing system according to claim 8,
wherein the transceiver of the server receives, from another terminal or a program of the game, a request for an action reservation for a second character;
wherein the processor of the server outputs, to the memory of the server, the request when the processor of the server determines the second character is in the active state, and
wherein the memory of the server registers the second character in the earliest reservation slot in the action sequence among the plurality of reservation slots in which no other characters have been registered.

11. An information processing device that is connected via a network to at least a terminal device comprising:
a memory that stores:
characters in a game;
a plurality of reservation slots into which action reservations for the characters are registered; and an action sequence for each of the reservation slots;
a display that displays the characters registered associated with the reservation slots, according to the action sequence; and
a receiver that receives, from the terminal device, a request for action reservations for a first character in the game; and
a processor connected to the memory, display, and the receiver and that outputs, to the memory, the request when the processor determines the first character is in an active state in which the character is allowed to register the action reservation,
wherein the memory registers the first character in an earliest reservation slot in the action sequence among the plurality of reservation slots in which no other characters have been registered,
wherein the processor causes the first character to execute an action for the first character associated with the reservation slot in accordance with the action sequence,
wherein the plurality of reservation slots includes:
a first reservation slot in which an effect has been set; and
a second reservation slot in which the effect has not been set,
wherein, when the reservation slot associated with the first character is the first reservation slot, the effect associated with the first character is applied to the executed action,
wherein the effect is at least one of enabling a skill of the first character to be activated, increasing attack strength or defense strength of the first character, expanding an attack range, and changing strength recovery of the first character,
wherein the effect is set in the first reservation slot before the first reservation slot is associated with the first character, and
wherein the effect is applied to the action to be executed by the first character before the action is executed or simultaneously to when the action is executed.

12. The information processing device according to claim 11, wherein the processor manages whether each of the characters is in the active state in which each of the characters is allowed to register the action reservation.

13. The information processing device according to claim 11,
wherein the receiver receives, from another terminal or a program of the game, a request for an action reservation for a second character;
wherein the processor outputs, to the memory, the request when the processor of the server determines the second character is in the active state, and
wherein the memory registers the second character in the earliest reservation slot in the action sequence among the plurality of reservation slots in which no other characters have been registered.

* * * * *